(12) United States Patent
Sung

(10) Patent No.: US 9,868,100 B2
(45) Date of Patent: Jan. 16, 2018

(54) BRAZED DIAMOND TOOLS AND METHODS FOR MAKING THE SAME

(76) Inventor: Chien-Min Sung, Tansui (TW)

(*) Notice: Subject to any disclaimer, the term of this patent is extended or adjusted under 35 U.S.C. 154(b) by 494 days.

(21) Appl. No.: 13/153,176

(22) Filed: Jun. 3, 2011

(65) Prior Publication Data

US 2011/0296766 A1   Dec. 8, 2011

Related U.S. Application Data

(63) Continuation-in-part of application No. 12/463,897, filed on May 11, 2009, now Pat. No. 8,104,464, which is a continuation of application No. 11/818,894, filed on Jun. 14, 2007, now abandoned, which is a continuation of application No. 10/791,300, filed on Mar. 1, 2004, now Pat. No. 7,323,049, which is a continuation-in-part of application No. 10/259,168, filed on Sep. 27, 2002, now Pat. No. 7,124,753, which is a continuation-in-part of application No. 09/935,204, filed on Aug. 22, 2001, now Pat. No. 6,679,243, and a continuation-in-part of application No. 10/109,531, (Continued)

(51) Int. Cl.
| | |
|---|---|
| B24D 11/00 | (2006.01) |
| B01J 3/06 | (2006.01) |
| B24B 53/017 | (2012.01) |
| B24D 3/24 | (2006.01) |

(52) U.S. Cl.
CPC ............. *B01J 3/062* (2013.01); *B24B 53/017* (2013.01); *B24D 3/24* (2013.01); *B24D 11/001* (2013.01); *B01J 2203/061* (2013.01); *B01J 2203/062* (2013.01); *B01J 2203/066* (2013.01); *B01J 2203/068* (2013.01); *B01J 2203/0645* (2013.01); *B01J 2203/0655* (2013.01)

(58) Field of Classification Search
CPC ........ B24D 3/24; B24D 11/001; B24B 53/017
USPC ...... 51/297; 125/16.02, 12, 21, 22; 451/527, 451/529, 533, 544
See application file for complete search history.

(56) References Cited

U.S. PATENT DOCUMENTS

| | | | |
|---|---|---|---|
| 187,593 A | 2/1877 | Brown et al. | |
| 238,946 A | 3/1881 | McKitrick | |

(Continued)

FOREIGN PATENT DOCUMENTS

| | | |
|---|---|---|
| CN | 1197543 A | 10/1998 |
| CN | 1351922 | 6/2002 |

(Continued)

OTHER PUBLICATIONS

Sung et al.; Mechanism of the Solvent-Assisted Graphite to Diamond Transition Under High Pressure: Implications for the Selection of Catalysts, High Temperatures-High Pressure; 1995/1996; vol. 27/28; pp. 523-546.

(Continued)

*Primary Examiner* — Timothy V Eley
(74) *Attorney, Agent, or Firm* — Thorpe North & Western, LLP; David W. Osborne

(57) ABSTRACT

Superabrasive tools and methods for the making thereof are disclosed and described. In one aspect, superabrasive particles are chemically bonded to a matrix support material according to a predetermined pattern by a braze alloy. The brazing alloy may be provided as a powder, thin sheet, or sheet of amorphous alloy. A template having a plurality of apertures arranged in a predetermined pattern may be used to place the superabrasive particles on a given substrate or matrix support material.

18 Claims, 8 Drawing Sheets

Related U.S. Application Data filed on Mar. 27, 2002, now Pat. No. 6,884,155, which is a continuation-in-part of application No. 09/558,582, filed on Apr. 26, 2000, now Pat. No. 6,368,198, said application No. 09/935,204 is a continuation-in-part of application No. 08/835,117, filed on Apr. 4, 1997, and a continuation-in-part of application No. 09/399,573, filed on Sep. 20, 1999, now Pat. No. 6,286,498, which is a continuation-in-part of application No. 08/832,852, filed on Apr. 4, 1997, now abandoned, said application No. 10/109,531 is a continuation-in-part of application No. 09/558,582, filed on Apr. 26, 2000, now Pat. No. 6,368,198, and a continuation-in-part of application No. 09/447,620, filed on Nov. 22, 1999, now abandoned.

(56) References Cited

U.S. PATENT DOCUMENTS

| | | |
|---|---|---|
| 296,756 A | 4/1884 | Kirkpatrick |
| 1,854,071 A | 4/1932 | Schacht |
| 1,988,065 A | 1/1935 | Wooddell |
| 2,027,087 A | 1/1936 | Buckner |
| 2,027,307 A | 1/1936 | Schacht |
| 2,033,991 A | 3/1936 | Melton |
| 2,035,521 A | 3/1936 | Benner |
| 2,075,354 A | 3/1937 | Monier |
| 2,078,354 A | 4/1937 | Webster |
| RE20,660 E | 2/1938 | Schacht |
| 2,152,392 A | 3/1939 | Tone |
| 2,184,348 A | 12/1939 | Kirchner |
| 2,187,624 A | 1/1940 | Melton |
| 2,194,253 A | 3/1940 | Benner |
| 2,201,195 A | 5/1940 | Melton |
| 2,204,826 A | 6/1940 | Hermann |
| 2,268,663 A | 1/1942 | Kuzmick |
| 2,281,558 A | 5/1942 | Cross |
| 2,307,461 A | 1/1943 | Ogden |
| 2,318,570 A | 5/1943 | Carlton |
| 2,334,572 A | 11/1943 | Melton |
| 2,410,506 A | 11/1946 | Kirchner |
| 2,612,348 A | 9/1952 | Catallo |
| 2,725,693 A | 12/1955 | Smith |
| 2,811,960 A | 11/1957 | Fessel |
| 2,867,086 A | 1/1959 | Haley |
| 2,876,086 A | 3/1959 | Raymond |
| 2,947,608 A | 8/1960 | Hall |
| 2,652,951 A | 9/1960 | Simpson |
| 2,952,951 A | 9/1960 | Simpson |
| 3,067,551 A | 12/1962 | Maginnis |
| 3,121,981 A | 2/1964 | Hurst |
| 3,127,715 A | 4/1964 | Christensen |
| 3,146,560 A | 9/1964 | Hurst |
| 3,276,852 A | 10/1966 | Lemolson |
| 3,293,012 A | 12/1966 | Smiley |
| 3,372,010 A | 3/1968 | Parsons |
| 3,377,411 A | 4/1968 | Charvat |
| 3,416,560 A | 12/1968 | Bruno |
| 3,440,774 A | 4/1969 | Curn |
| 3,593,382 A | 7/1971 | Miller |
| 3,608,134 A | 9/1971 | Cook |
| 3,625,666 A | 12/1971 | James |
| 3,630,699 A | 12/1971 | Catlin |
| 3,664,662 A | 5/1972 | Linz |
| 3,631,638 A | 7/1972 | Yoshikawa et al. |
| 3,706,650 A | 12/1972 | Eisner |
| 3,743,489 A | 7/1973 | Wentorf et al. |
| 3,767,371 A | 10/1973 | Wentorf et al. |
| 3,787,273 A | 1/1974 | Okrepkie |
| 3,802,130 A | 4/1974 | Lindenbeck |
| 3,819,814 A | 6/1974 | Pope |
| 3,852,078 A | 12/1974 | Wakatsuki et al. |
| 3,894,673 A | 7/1975 | Lowder et al. |
| 3,905,571 A | 9/1975 | Lombardo |
| 3,982,358 A | 9/1976 | Fukuda |
| 4,018,576 A | 4/1977 | Lowder et al. |
| 4,028,576 A | 6/1977 | Wofsey |
| 4,078,906 A | 3/1978 | Green |
| 4,108,576 A | 8/1978 | Landfors |
| 4,149,881 A | 4/1979 | D'Silva |
| 4,151,154 A | 4/1979 | Berger |
| 4,155,721 A | 5/1979 | Fletcher |
| 4,182,628 A | 1/1980 | D'Silva |
| 4,188,194 A | 2/1980 | Gorrigan |
| 4,201,601 A | 5/1980 | D'Silva |
| 4,211,924 A | 7/1980 | Multakh |
| 4,224,380 A | 9/1980 | Bovenkerek et al. |
| 4,228,214 A | 10/1980 | Steigelman et al. |
| 4,229,186 A | 10/1980 | Wilson |
| 4,273,561 A | 6/1981 | Villalobos |
| 4,287,168 A | 9/1981 | Wentorf, Jr. et al. |
| 4,289,503 A | 9/1981 | Corrigan |
| 4,341,532 A | 7/1982 | Olde |
| 4,355,489 A | 10/1982 | Heyer et al. |
| 4,405,411 A | 9/1983 | Inoue et al. |
| 4,481,016 A | 11/1984 | Campbell et al. |
| 4,525,179 A | 6/1985 | Gigl |
| 4,547,257 A | 10/1985 | Iizuka |
| 4,551,195 A | 11/1985 | Iizuka |
| 4,565,034 A | 1/1986 | Sekiya |
| 4,610,699 A | 9/1986 | Yazu et al. |
| 4,617,181 A | 10/1986 | Yazu et al. |
| 4,629,373 A | 12/1986 | Hall |
| 4,632,817 A | 12/1986 | Yazu et al. |
| 4,662,896 A | 5/1987 | Mahlon |
| 4,669,522 A | 6/1987 | Griffin |
| 4,680,199 A | 7/1987 | Vontell et al. |
| 4,712,552 A | 12/1987 | Pangburn |
| 4,737,162 A | 4/1988 | Grazen |
| 4,749,514 A | 6/1988 | Murakami et al. |
| 4,770,907 A | 9/1988 | Kimura |
| 4,776,861 A | 10/1988 | Frushour |
| 4,780,274 A | 10/1988 | Barr |
| 4,797,241 A | 1/1989 | Peterson et al. |
| 4,828,582 A | 5/1989 | Frushour |
| 4,849,602 A | 7/1989 | Gardner |
| 4,863,573 A | 9/1989 | Moore et al. |
| 4,866,888 A | 9/1989 | Murai et al. |
| 4,883,500 A | 11/1989 | Deakins et al. |
| 4,901,480 A | 2/1990 | Dillion |
| 4,908,046 A | 3/1990 | Wiand |
| 4,916,869 A | 4/1990 | Oliver |
| 4,923,490 A | 5/1990 | Johnson et al. |
| 4,925,457 A | 5/1990 | Dekok et al. |
| 4,927,619 A | 5/1990 | Tsuii |
| 4,943,488 A | 7/1990 | Sung et al. |
| 4,945,686 A | 8/1990 | Wiand |
| 4,949,511 A | 8/1990 | Endo et al. |
| 4,954,139 A | 9/1990 | Cerutti |
| 4,968,326 A | 11/1990 | Wiand |
| 5,000,273 A | 3/1991 | Horton et al. |
| 5,011,513 A | 4/1991 | Zador et al. |
| 5,022,895 A | 6/1991 | Wiand |
| 5,024,680 A | 6/1991 | Chen et al. |
| 5,030,276 A | 7/1991 | Sung et al. |
| 5,037,451 A | 8/1991 | Burnand et al. |
| 5,043,120 A | 8/1991 | Corrigan |
| 5,049,165 A | 9/1991 | Tselesin |
| 5,092,082 A | 3/1992 | Padberg et al. |
| 5,092,910 A | 3/1992 | deKok et al. |
| 5,116,568 A | 5/1992 | Sung et al. |
| 5,131,924 A | 7/1992 | Wiand |
| 5,133,782 A | 7/1992 | Wiand |
| 5,137,543 A | 8/1992 | Heath et al. |
| 5,151,107 A | 9/1992 | Cho et al. |
| 5,164,247 A | 11/1992 | Solanki et al. |
| 5,176,155 A | 1/1993 | Rudolph, Jr. |
| 5,190,568 A | 3/1993 | Tselesin |
| 5,194,070 A | 3/1993 | Sumiya et al. |
| 5,194,071 A | 3/1993 | Corrigan et al. |
| 5,195,403 A | 3/1993 | Sani et al. |
| 5,195,404 A | 3/1993 | Notter et al. |
| 5,197,249 A | 3/1993 | Wiand |

(56) References Cited

U.S. PATENT DOCUMENTS

| | | |
|---|---|---|
| 5,203,881 A | 4/1993 | Wiand |
| 5,224,469 A | 7/1993 | Mocny |
| 5,232,320 A | 8/1993 | Tank et al. |
| 5,243,790 A | 9/1993 | Gagne |
| 5,246,884 A | 9/1993 | Jaso et al. |
| 5,247,765 A | 9/1993 | Quintana |
| 5,248,317 A | 9/1993 | Tank |
| 5,264,011 A | 11/1993 | Brown et al. |
| 5,266,236 A | 11/1993 | Bovenkerk |
| 5,271,547 A | 12/1993 | Carlson |
| 5,273,730 A | 12/1993 | Yoshida et al. |
| 5,295,402 A | 3/1994 | Bovenkerk |
| 5,314,513 A | 5/1994 | Miller |
| 5,328,548 A | 7/1994 | Tsuji et al. |
| 5,364,423 A | 11/1994 | Bigelow et al. |
| 5,374,293 A | 12/1994 | Takashita et al. |
| 5,380,390 A | 1/1995 | Tselesin |
| 5,443,032 A | 8/1995 | Vichr et al. |
| 5,453,106 A | 9/1995 | Roberts |
| 5,454,343 A | 10/1995 | Eun et al. |
| 5,458,754 A | 10/1995 | Sathrum et al. |
| 5,486,131 A | 1/1996 | Cesna et al. |
| 5,492,771 A | 2/1996 | Lowder et al. |
| 5,492,774 A | 2/1996 | Tateno et al. |
| 5,496,386 A | 3/1996 | Broberg et al. |
| 5,500,248 A | 3/1996 | Iacovangelo et al. |
| 5,505,272 A | 4/1996 | Clark |
| 5,518,443 A | 5/1996 | Fisher |
| 5,527,424 A | 6/1996 | Mullins |
| 5,536,202 A | 7/1996 | Appel et al. |
| 5,547,417 A | 8/1996 | Breivogel et al. |
| 5,551,959 A | 9/1996 | Martin et al. |
| 5,560,745 A | 10/1996 | Roberts |
| 5,560,754 A | 10/1996 | Johnson et al. |
| 5,609,286 A | 3/1997 | Anthon |
| 5,620,489 A | 4/1997 | Tselesin |
| 5,660,894 A | 8/1997 | Chen et al. |
| 5,669,943 A | 9/1997 | Horton et al. |
| 5,674,572 A | 10/1997 | Sarin et al. |
| 5,725,421 A | 3/1998 | Goers et al. |
| 5,746,931 A | 5/1998 | Graebner et al. |
| RE35,812 E | 6/1998 | Oliver |
| 5,772,756 A | 6/1998 | Davies et al. |
| 5,776,214 A | 7/1998 | Wood |
| 5,779,743 A | 7/1998 | Wood |
| 5,791,975 A | 8/1998 | Cesna et al. |
| 5,801,073 A | 9/1998 | Robbins et al. |
| 5,816,891 A | 10/1998 | Woo |
| 5,820,450 A | 10/1998 | Calhoun |
| 5,833,519 A | 11/1998 | Moore |
| 5,840,090 A | 11/1998 | Ho et al. |
| 5,851,138 A | 12/1998 | Hempel, Jr. |
| 5,855,314 A | 1/1999 | Shiue et al. |
| 5,868,806 A | 2/1999 | Nishio et al. |
| 5,885,137 A | 3/1999 | Ploessl |
| 5,902,173 A | 5/1999 | Tanaka |
| 5,916,011 A | 6/1999 | Kim et al. |
| 5,919,084 A | 7/1999 | Powell et al. |
| 5,921,856 A | 7/1999 | Zimmer |
| 5,924,917 A | 7/1999 | Benedict et al. |
| 5,961,373 A | 10/1999 | Lai et al. |
| 5,975,988 A | 11/1999 | Christianson |
| 5,976,001 A | 11/1999 | Powell et al. |
| 5,976,205 A | 11/1999 | Andrews et al. |
| 5,980,852 A | 11/1999 | Burns et al. |
| 5,980,982 A | 11/1999 | Degawa et al. |
| 5,985,228 A | 11/1999 | Corrigan et al. |
| 6,001,008 A | 12/1999 | Fujimori et al. |
| 6,001,174 A | 12/1999 | Fang |
| 6,024,824 A | 2/2000 | Krech |
| 6,027,659 A | 2/2000 | Billet |
| 6,030,595 A | 2/2000 | Sumiya et al. |
| 6,039,641 A | 3/2000 | Sung |
| 6,054,183 A | 4/2000 | Zimmer et al. |
| 6,093,280 A | 7/2000 | Kirchner et al. |
| 6,106,382 A | 8/2000 | Sakaguchi |
| 6,123,612 A | 9/2000 | Goers |
| 6,125,612 A | 10/2000 | Main |
| 6,159,087 A | 12/2000 | Briang et al. |
| 6,159,286 A | 12/2000 | Sung |
| 6,179,886 B1 | 1/2001 | Gordeev et al. |
| 6,190,240 B1 | 2/2001 | Kinoshita et al. |
| 6,193,770 B1 | 2/2001 | Sung |
| 6,196,911 B1 | 3/2001 | Preston et al. |
| 6,200,360 B1 | 3/2001 | Imai et al. |
| 6,206,942 B1 | 3/2001 | Wood et al. |
| 6,213,856 B1 | 4/2001 | Cho et al. |
| 6,217,413 B1 | 4/2001 | Christianson |
| 6,224,469 B1 | 5/2001 | Ohmori et al. |
| 6,258,138 B1 | 7/2001 | DeVoe et al. |
| 6,258,201 B1 | 7/2001 | Krech |
| 6,258,237 B1 | 7/2001 | Gal-Or et al. |
| 6,281,129 B1 | 8/2001 | Easter et al. |
| 6,284,556 B1 | 9/2001 | Wang et al. |
| 6,286,498 B1 | 9/2001 | Sung |
| 6,293,854 B1 | 9/2001 | Kimura et al. |
| 6,299,508 B1 | 10/2001 | Gagliardi et al. |
| 6,299,521 B1 | 10/2001 | Morimura et al. |
| 6,312,324 B1 | 11/2001 | Mitsui et al. |
| 6,319,108 B1 | 11/2001 | Adefris et al. |
| 6,325,709 B1 | 12/2001 | Nanda et al. |
| 6,346,202 B1 | 2/2002 | Molnar |
| 6,354,918 B1 | 3/2002 | Togawa et al. |
| 6,354,929 B1 | 3/2002 | Adefris et al. |
| 6,368,198 B1 | 4/2002 | Sung et al. |
| 6,371,838 B1 | 4/2002 | Holzapfel |
| 6,371,842 B1 | 4/2002 | Romero |
| 6,372,001 B1 | 4/2002 | Omar et al. |
| 6,394,886 B1 | 5/2002 | Chen et al. |
| 6,409,580 B1 | 6/2002 | Lougher et al. |
| 6,416,878 B2 | 7/2002 | An |
| 6,419,574 B1 | 7/2002 | Takahashi |
| 6,439,986 B1 | 8/2002 | Myoung et al. |
| 6,446,740 B2 | 9/2002 | Eyre |
| 6,458,018 B1 | 10/2002 | Goers et al. |
| 6,478,831 B2 | 11/2002 | Tselesin |
| 6,497,853 B1 | 12/2002 | Davies et al. |
| 6,544,599 B1 | 4/2003 | Brown et al. |
| 6,551,176 B1 | 4/2003 | Garretson |
| 6,605,798 B1 | 8/2003 | Cullen |
| 6,607,423 B1 | 8/2003 | Areayan et al. |
| 6,616,725 B2 | 9/2003 | Cho et al. |
| 6,616,752 B1 | 9/2003 | Basura et al. |
| 6,626,167 B2 | 9/2003 | Kim et al. |
| 6,627,168 B1 | 9/2003 | Ohtsubo et al. |
| 6,629,884 B1 | 10/2003 | Goers |
| 6,646,725 B1 | 11/2003 | Eichinger et al. |
| 6,672,943 B2 | 1/2004 | Vogtmann |
| 6,679,243 B2 | 1/2004 | Sung |
| 6,692,547 B2 | 2/2004 | Kim |
| 6,694,847 B2 | 2/2004 | Hiroyasu et al. |
| 6,722,952 B2 | 4/2004 | Goers et al. |
| 6,749,485 B1 | 6/2004 | James et al. |
| 6,755,720 B1 | 6/2004 | Ishizaki et al. |
| 6,769,969 B1 | 8/2004 | Duescher |
| 6,790,126 B2 | 9/2004 | Wood et al. |
| 6,818,029 B2 | 11/2004 | Myoung et al. |
| 6,824,455 B2 | 11/2004 | Osterheld et al. |
| 6,835,365 B1 | 12/2004 | Davies et al. |
| 6,837,979 B2 | 1/2005 | Uzho et al. |
| 6,884,155 B2 | 4/2005 | Sung et al. |
| 6,899,592 B1 | 5/2005 | Kojima |
| 6,905,571 B2 | 6/2005 | Sakuma et al. |
| 6,935,365 B2 | 8/2005 | Schuster et al. |
| 6,945,857 B1 | 9/2005 | Doan et al. |
| 6,979,357 B2 | 12/2005 | Fries et al. |
| 7,021,995 B2 | 4/2006 | Toge et al. |
| 7,033,408 B2 | 4/2006 | Fries et al. |
| 7,044,990 B2 | 5/2006 | Ishizaki et al. |
| 7,066,795 B2 | 6/2006 | Balagani et al. |
| 7,067,903 B2 | 6/2006 | Takeshi et al. |
| 7,124,753 B2 | 10/2006 | Sung |
| 7,150,677 B2 | 12/2006 | Yamashita et al. |
| 7,198,553 B2 | 4/2007 | Goers |

(56) References Cited

U.S. PATENT DOCUMENTS

| | | |
|---|---|---|
| 7,201,645 B2 | 4/2007 | Sung |
| 7,247,577 B2 | 7/2007 | Palmgren et al. |
| 7,258,708 B2 | 8/2007 | Sung |
| 7,261,621 B2 | 8/2007 | Moon et al. |
| 7,323,049 B2 | 1/2008 | Sung |
| 7,368,013 B2 | 5/2008 | Sung |
| 7,384,436 B2 | 6/2008 | Sung |
| 7,404,857 B2 | 7/2008 | Sung |
| 7,465,217 B2 | 12/2008 | Kinoshita et al. |
| 7,494,404 B2 | 2/2009 | Sung |
| 7,507,267 B2 | 3/2009 | Hall et al. |
| 7,585,366 B2 | 9/2009 | Sung |
| 7,641,538 B2 | 1/2010 | Goers |
| 7,651,368 B2 | 1/2010 | Kendall et al. |
| 7,651,386 B2 | 1/2010 | Sung |
| 7,658,666 B2 | 2/2010 | Sung |
| 7,690,971 B2 | 4/2010 | Sung |
| 7,762,872 B2 | 7/2010 | Sung |
| 7,791,188 B2 | 9/2010 | Sung |
| 7,840,305 B2 | 11/2010 | Behr et al. |
| 7,954,483 B2 | 6/2011 | Kim et al. |
| 8,104,464 B2 | 1/2012 | Sung |
| 8,377,158 B2 | 2/2013 | Palmgren et al. |
| 8,393,934 B2 | 3/2013 | Sung |
| 8,545,583 B2 | 10/2013 | Duescher |
| 8,622,787 B2 | 1/2014 | Sung |
| 8,974,270 B2 | 3/2015 | Sung |
| 9,138,862 B2 | 9/2015 | Sung |
| 2001/0003884 A1 | 6/2001 | Wei et al. |
| 2001/0009844 A1 | 7/2001 | Cho et al. |
| 2001/0046835 A1 | 11/2001 | Wielonski et al. |
| 2002/0014041 A1 | 2/2002 | Baldonai et al. |
| 2002/0042200 A1 | 4/2002 | Fawcett |
| 2002/0077037 A1 | 6/2002 | Teitz |
| 2002/0127962 A1 | 9/2002 | Cho et al. |
| 2002/0139680 A1 | 10/2002 | George |
| 2002/0164928 A1 | 11/2002 | Tolles |
| 2002/0173234 A1 | 11/2002 | Sung et al. |
| 2002/0182401 A1 | 12/2002 | Lawing |
| 2003/0054746 A1 | 3/2003 | Nussbaumer |
| 2003/0084894 A1 | 5/2003 | Sung |
| 2003/0092357 A1 | 5/2003 | Yoon et al. |
| 2003/0114094 A1 | 6/2003 | Myoung et al. |
| 2003/0207659 A1 | 11/2003 | Annen et al. |
| 2004/0009742 A1 | 1/2004 | Lin et al. |
| 2004/0023610 A1 | 2/2004 | Hu et al. |
| 2004/0048557 A1 | 3/2004 | Nabeya |
| 2004/0060243 A1 | 4/2004 | Fries et al. |
| 2004/0079033 A1 | 4/2004 | Long |
| 2004/0091627 A1 | 5/2004 | Ohara et al. |
| 2004/0107648 A1 | 6/2004 | Sung |
| 2004/0112359 A1 | 6/2004 | Sung |
| 2004/0180617 A1 | 9/2004 | Goers |
| 2004/0203325 A1 | 10/2004 | Donohue |
| 2004/0235406 A1 | 11/2004 | Duescher |
| 2004/0238946 A1 | 12/2004 | Tachibana et al. |
| 2005/0032462 A1 | 2/2005 | Gagliardi et al. |
| 2005/0032469 A1 | 2/2005 | Duescher |
| 2005/0060941 A1 | 3/2005 | Provow |
| 2005/0095959 A1 | 5/2005 | Sung |
| 2005/0118939 A1 | 6/2005 | Duescher |
| 2005/0215188 A1 | 9/2005 | Toge et al. |
| 2005/0227590 A1 | 10/2005 | Sung |
| 2005/0260939 A1 | 11/2005 | Andrews et al. |
| 2006/0073774 A1 | 4/2006 | Sung |
| 2006/0079160 A1 | 4/2006 | Balagani et al. |
| 2006/0079162 A1 | 4/2006 | Yamashita et al. |
| 2006/0128288 A1 | 6/2006 | An et al. |
| 2006/0135050 A1 | 6/2006 | Petersen et al. |
| 2006/0143991 A1 | 7/2006 | Sung |
| 2006/0213128 A1 | 9/2006 | Sung |
| 2006/0254154 A1 | 11/2006 | Haung et al. |
| 2006/0258276 A1 | 11/2006 | Sung |
| 2007/0051354 A1 | 3/2007 | Sung |
| 2007/0051355 A1 | 3/2007 | Sung |
| 2007/0060026 A1 | 3/2007 | Sung |
| 2007/0066194 A1 | 3/2007 | Wielonski et al. |
| 2007/0093181 A1 | 4/2007 | Lugg et al. |
| 2007/0128994 A1 | 6/2007 | Sung |
| 2007/0155298 A1 | 7/2007 | Sung |
| 2007/0167117 A1 | 7/2007 | Moon |
| 2007/0232074 A1 | 10/2007 | Kramadhati et al. |
| 2007/0249270 A1 | 10/2007 | Sung |
| 2007/0254566 A1 | 11/2007 | Sung |
| 2007/0264918 A1 | 11/2007 | Sung |
| 2007/0266639 A1 | 11/2007 | Sung |
| 2007/0295267 A1 | 12/2007 | Sung |
| 2008/0014845 A1 | 1/2008 | Yimaz et al. |
| 2008/0076338 A1 | 3/2008 | Andrews et al. |
| 2008/0096479 A1 | 4/2008 | Sung |
| 2008/0153398 A1 | 6/2008 | Sung |
| 2008/0171503 A1 | 7/2008 | Sung |
| 2008/0271384 A1 | 11/2008 | Puthanangady et al. |
| 2008/0292869 A1 | 11/2008 | Sung |
| 2008/0296756 A1 | 12/2008 | Koch et al. |
| 2009/0068937 A1 | 3/2009 | Sung |
| 2009/0073774 A1 | 3/2009 | Horesh et al. |
| 2009/0093195 A1 | 4/2009 | Sung |
| 2009/0094902 A1 | 4/2009 | Hou |
| 2009/0123705 A1 | 5/2009 | Sung |
| 2009/0145045 A1 | 6/2009 | Sung |
| 2009/0215363 A1 | 8/2009 | Sung |
| 2009/0283089 A1 | 11/2009 | Sung |
| 2010/0015898 A1 | 1/2010 | An et al. |
| 2010/0022174 A1 | 1/2010 | Chou et al. |
| 2010/0139174 A1 | 6/2010 | Sung |
| 2010/0186479 A1 | 7/2010 | Borucki et al. |
| 2010/0203811 A1 | 8/2010 | Philipossian et al. |
| 2010/0221990 A1 | 9/2010 | Sung |
| 2010/0248595 A1 | 9/2010 | Dinh-Ngoc |
| 2010/0248596 A1 | 9/2010 | Sung |
| 2010/0261419 A1 | 10/2010 | Sung |
| 2011/0076925 A1 | 3/2011 | Sung |
| 2011/0104989 A1 | 5/2011 | Boutaghou et al. |
| 2011/0192652 A1 | 8/2011 | Shen et al. |
| 2011/0212670 A1 | 9/2011 | Sung |
| 2011/0252710 A1 | 10/2011 | Hall et al. |
| 2011/0275288 A1 | 11/2011 | Sung |
| 2011/0293905 A1 | 12/2011 | Sung |
| 2011/0296766 A1 | 12/2011 | Sung |
| 2012/0192499 A1 | 8/2012 | Sung |
| 2012/0241943 A1 | 9/2012 | Sung |
| 2012/0244790 A1 | 9/2012 | Sung |
| 2012/0260582 A1 | 10/2012 | Sung |
| 2012/0302146 A1 | 11/2012 | Sung |
| 2013/0225052 A1 | 8/2013 | Song et al. |

FOREIGN PATENT DOCUMENTS

| | | |
|---|---|---|
| CN | 1482959 A | 3/2004 |
| CN | 1494984 | 5/2004 |
| CN | 1532026 A | 9/2004 |
| CN | 1548271 A | 11/2004 |
| EP | 0238434 | 3/1987 |
| EP | 0264674 | 9/1987 |
| EP | 0280657 | 8/1988 |
| EP | 0331344 | 2/1989 |
| EP | 0712941 | 5/1996 |
| EP | 1075898 | 2/2001 |
| GB | 2239011 | 6/1991 |
| GB | 2366804 | 3/2002 |
| JP | 06182184 | 7/1994 |
| JP | 10128654 | 5/1998 |
| JP | 10180618 | 7/1998 |
| JP | 11048122 | 2/1999 |
| JP | 11077536 | 3/1999 |
| JP | 200167774 | 6/2000 |
| JP | 2000343436 | 12/2000 |
| JP | 2003/071718 | 3/2003 |
| JP | 2003/0717189 | 3/2003 |
| JP | 2004/025401 | 1/2004 |
| JP | 2007-044823 | 2/2007 |
| KR | 10-2002-0036138 A | 5/2002 |
| KR | 200339181 | 1/2004 |

(56) References Cited

FOREIGN PATENT DOCUMENTS

| KR | 10-2007-0063569 A | 6/2007 |
|---|---|---|
| WO | WO94/27883 | 12/1994 |
| WO | WO 95/27596 | 10/1995 |
| WO | WO 95/31006 | 11/1995 |
| WO | WO96/06732 | 3/1996 |
| WO | WO 96/06732 | 3/1996 |
| WO | WO 98/10897 | 3/1998 |
| WO | WO 98/45091 | 3/1998 |
| WO | WO 98/45092 | 3/1998 |
| WO | WO 98/51448 | 3/1998 |
| WO | WO 98/45092 | 10/1998 |
| WO | WO02/31078 | 4/2002 |
| WO | WO2004/094106 | 11/2004 |
| WO | WO2006/039413 | 4/2006 |
| WO | WO2006/124792 | 11/2006 |
| WO | WO2007/032946 | 3/2007 |
| WO | WO2008/063599 | 5/2008 |
| WO | WO 2009/043058 | 4/2009 |
| WO | WO 2009/064677 | 5/2009 |
| WO | WO 2012/040374 A2 | 3/2012 |

OTHER PUBLICATIONS

Material Safety Data Sheet (MSDS), Wall Colmonoy Corporation; prepared Jul. 20, 1989.
Kennametal Specification for DMHPM002 Hot Press Matrix N-50; Dec. 6, 2001.
Material Safety Data Sheet (MSDS); Kennametal; issued Jun. 11, 2004.
Endecott's Specifications; 2004.
Colmonoy Technical Data Sheet; No. DSP-1A; 1993.
Sung; The Eastern Wind of Diamond Synthesis; new Diamond and Frontier Carbon Technology; 2003; pp. 47-61; vol. 13, No. 1.
Related Matter: U.S. Appl. No. 09/447,620, filed Nov. 22, 1999; Chien-Min Sung.
Related Matter: U.S. Appl. No. 08/832,852, filed Apr. 4, 1997; Chien-Min Sung.
PCT Application PCT/US2011/052627; filing date Sep. 21, 2011; Chien-Min Sung; International Search Report dated May 11, 2012.
U.S. Appl. No. 13/362,917, filed Jan. 31, 2012; Chien-Min Sung; office action dated Jun. 14, 2012.
U.S. Appl. No. 12/059,422, filed Mar. 30, 2008; Chien-Min Sung; office action dated Aug. 22, 2012.
U.S. Appl. No. 12/255,823, filed Oct. 21, 2008; Chien-Min Sung; notice of allowance dated Sep. 21, 2012.
U.S. Appl. No. 12/168,110, filed Jul. 5, 2008; Chien-Min Sung; notice of allowance dated Sep. 28, 2012.
U.S. Appl. No. 13/239,189, filed Sep. 21, 2011; Chien-Min Sung; office action dated Dec. 21, 2012.
U.S. Appl. No. 12/255,823, filed Oct. 22, 2008; Chien-Min Sung; notice of allowance dated Dec. 26, 2012.
PCT/US2012/039199; filed May 23, 2012; Chien-Min Sung; International Search Report dated Dec. 18, 2012.
U.S. Appl. No. 13/362,917, filed Jan. 13, 2012; Chien-Min Sung; office action dated Dec. 31, 2012.
U.S. Appl. No. 12/168,110, filed Jul. 5, 2008; Chien-Min Sung; notice of allowance dated Jan. 18, 2013.
Syndite, CTM302; Announcement, Elementsix Advancing Diamond; Jan. 14, 2003; http://www.e6.com/en/resourfes/announcementsheets/CTM302.pdf; as accessed on Dec. 16, 2008.
Syndite; Elementsix Advancing Diamond; 2 pages.
Yasinaga et al; Advances in Abrasive Technology, III; Soc. Of Grinding Engineers (SGE) in Japan; 2000.
Implications for the Selection of Catalysts, High Temperatures-High Pressure; 1995/1996; pp. 523-546; vol. 27/28.
Syndire; Elementssix Advancing Diamond; 2 pages; www.c6.com.
PCT Application PCT/US2007/024165; filed Nov. 16, 2007; Chien-Min Sung; International Search report dated May 23, 2011.
PCT Application PCT/US2011/052626; filing date Sep. 21, 2011; Chien-Min Sung; International Search Report dated May 2, 2012.
PCT Application PCT/US2013/042538; filing date May 23, 2013; Chien-Min Sung; International Search Report dated Aug. 27, 2013.
U.S. Appl. No. 12/168,110, filed Jul. 5, 2008; Chien-Min Sung; office action dated May 14, 2012.
U.S. Appl. No. 12/255,823, filed Oct. 22, 2005; Chien-Min Sung; office action dated Mar. 7, 2012.
U.S. Appl. No. 12/267,172, filed Nov. 7, 2008; Chien-Min Sung; office action dated Jan. 3, 2012.
U.S. Appl. No. 12/267,172, filed Jan. 31, 2012; Chien-Min Sung; office action dated Jul. 9, 2012.
U.S. Appl. No. 12/715,583, filed Mar. 2, 2010; Chien-Min Sung; office action dated Mar. 21, 2012.
U.S. Appl. No. 12/362,917, filed Jan. 31, 2012; Chien-Min Sung; office action dated Apr. 10, 2013.
U.S. Appl. No. 12/715,583, filed Mar. 2, 2010; Chien-Min Sung; office action dated Aug. 9, 2012.
U.S. Appl. No. 12/715,583, filed Mar. 2, 2010; Chien-Min Sung; office action dated Oct. 25, 2011.
U.S. Appl. No. 12/726,786, filed Mar. 18, 2010; Chien-Min Sung; office action dated Mar. 19, 2013.
U.S. Appl. No. 13/239,189, filed Sep. 21, 2011; Chien-Min Sung; notice of allowance dated May 3, 2013.
U.S. Appl. No. 13/239,198, filed Sep. 21, 2011; Chien-Min Sung; notice of allowance dated Mar. 4, 2014.
U.S. Appl. No. 12/328,338, filed Dec. 4, 2008; Chien-Min Sung; Office action dated May 10, 2011.
U.S. Appl. No. 13/021,350, filed Feb. 4, 2011; Chien-Min Sung; office action dated Aug. 31, 2011.
U.S. Appl. No. 13/021,350, filed Feb. 4, 2011; Chien-Min Sung; office action dated Feb. 7, 2012.
U.S. Appl. No. 13/021,350, filed Feb. 4, 2011; Chien-Min Sung; office action dated Mar. 20, 2013.
U.S. Appl. No. 13113,779, filed May 23, 2011; Chien-Min Sung; office action dated Nov. 12, 2013.
U.S. Appl. No. 13/239,198, filed Sep. 21, 2011; Chien-Min Sung; office action dated Jul. 23, 2013.
U.S. Appl. No. 13/362,917, filed Jan. 31, 2012; Chien-Min Sung; office action dated Apr. 10, 2013.
U.S. Appl. No. 13/153,176, filed Jun. 3, 2011; Chien-Min Sung; office action dated Dec. 6, 2013.
U.S. Appl. No. 13/479,148, filed May 23, 2012; Chien-Min Sung; office action dated May 15, 2014.
U.S. Appl. No. 12/715,583, filed Mar. 2, 2010; Chien-Min Sung; notice of allowance dated Dec. 7, 2012.
U.S. Appl. No. 12/267,172, filed Nov. 7, 2008; Chien-Min Sung; notice of allowance dated Jan. 7, 2013.
U.S. Appl. No. 12/726,786, filed Mar. 18, 2010; Chien-Min Sung; notice of allowance mailed Sep. 4, 2013.
U.S. Appl. No. 12/059,422, filed Mar. 31, 2008; Chien-Min Sung; office action dated Jan. 24, 2013.
U.S. Appl. No. 08/832,852, filed Apr. 4, 1997; Chien-Min Sung.
U.S. Appl. No. 09/447,620, filed Nov. 22, 1999; CHien-Min Sung.
U.S. Appl. No. 11/512,755, filed Aug. 29, 2006; Chien-Min Sung.
U.S. Appl. No. 13/407,634, filed Feb. 28, 2012; Chien-Min Sung; office action dated Jun. 13, 2014.
U.S. Appl. No. 13/644,790, filed Oct. 4, 2012; Chien-Min Sung; office action dated Jun. 17, 2014.
U.S. Appl. No. 13/416,201, filed Mar. 9, 2012; Chien-Min Sung; office action dated Jun. 18, 2014.
U.S. Appl. No. 13/113,779, filed May 23, 2011; Chien-Min Sung; office action dated Jul. 2, 2014.
U.S. Appl. No. 13/794,164, filed Mar. 11, 2013; Chien-Min Sung; office action dated Jul. 16, 2014.
U.S. Appl. No. 13/802,112, filed Mar. 13, 2013; Chien-Min Sung; office action dated Nov. 6, 2014.
U.S. Appl. No. 13/479,148, filed May 23, 2012; Chien-Min Sung; Notice of Allowance dated Dec. 9, 2014.
U.S. Appl. No. 13/644,790, filed Oct. 4, 2012; Chien-Min Sung; office action dated Dec. 24, 2014.
U.S. Appl. No. 13/113,779, filed May 23, 2011; Chien-Min Sung; office action dated Oct. 9, 2014.
U.S. Appl. No. 13/407,634, filed Feb. 28, 2012; Chien-Min Sung; office action dated Oct. 29, 2014.

(56) References Cited

OTHER PUBLICATIONS

U.S. Appl. No. 13/802,112, filed Mar. 13, 2013; Chien-Min Sung; Notice of Allowance dated May 15, 2015.
U.S. Appl. No. 13/416,201, filed Mar. 9, 2012; Chien-Min Sung; Office Action dated May 15, 2015.
U.S. Appl. No. 13/644,790, filed Oct. 4, 2012; Chien-Min Sung; Notice of Allowance dated Jun. 8, 2015.
U.S. Appl. No. 13/113,779, filed May 23, 2011; Chien-Min Sung; Notice of Allowance dated Jul. 17, 2015.
U.S. Appl. No. 13/479,148, filed May 23, 2012; Chien-Min Sung; Notice of Allowance dated Jan. 12, 2015.
U.S. Appl. No. 13/416,201, filed Mar. 9, 2012; Chien-Min Sung; office action dated Jan. 22, 2015.
U.S. Appl. No. 13/113,779, filed May 23, 2011; Chien-Min Sung office action dated Feb. 10, 2015.
U.S. Appl. No. 13/794,164, filed Mar. 11, 2013; Chien-Min Sung; Notice of Allowance dated Feb. 13, 2015.
U.S. Appl. No. 13/633,082, filed Oct. 1, 2012; Chien-Min Sung; Office Action dated Feb. 26, 2015.
U.S. Appl. No. 13/407,634, filed Feb. 28, 2012; Chien-Min Sung; Office Action dated Mar. 5, 2015.
U.S. Appl. No. 14/223,810, filed Mar. 24, 2014; Chien-Min Sung; Office Action dated Oct. 8, 2015.
U.S. Appl. No. 14/120,976, filed Jul. 15, 2014; Chien-Min Sung; Office Action dated Oct. 15, 2015.
U.S. Appl. No. 14/506,476, filed Oct. 3, 2014; Chien-Min Sung; Office Action dated Oct. 30, 2015.
U.S. Appl. No. 13/846,740, filed Mar. 18, 2013; Chien-Min Sung; Office Action dated Nov. 4, 2015.
U.S. Appl. No. 13/633,082, filed Oct. 1, 2012; Chien-Min Sung; Notice of Allowance dated Aug. 19, 2015.
U.S. Appl. No. 13/407,634, filed Feb. 28, 2012; Chien-Min Sung; Notice of Allowance dated Sep. 3, 2015.

BRAZED DIAMOND TOOLS AND METHODS FOR MAKING THE SAME

PRIORITY DATA

This application is a continuation-in-part of U.S. patent application Ser. No. 12/463,897, filed on May 11, 2009, which is a continuation of U.S. patent application Ser. No. 11/818,894, filed on Jun. 14, 2007, which is a continuation of U.S. patent application Ser. No. 10/791,300, filed Mar. 1, 2004, now issued as U.S. Pat. No. 7,323,049, which is a continuation-in-part of U.S. patent application Ser. No. 10/259,168, filed Sep. 27, 2002, now issued as U.S. Pat. No. 7,124,753, which is a continuation-in-part of U.S. patent application Ser. No. 09/935,204, filed Aug. 22, 2001, now issued as U.S. Pat. No. 6,679,243, and of U.S. patent application Ser. No. 10/109,531, filed Mar. 27, 2002, now issued as U.S. Pat. No. 6,884,155. U.S. Pat. No. 6,679,243 is a continuation-in-part of U.S. patent application Ser. No. 08/835,117, filed on Apr. 4, 1997 and a continuation-in-part of U.S. patent application Ser. No. 09/399,573, filed Sep. 20, 1999, now issued as U.S. Pat. No. 6,286,498, which is a continuation-in-part of U.S. patent application Ser. No. 08/832,852, filed Apr. 4, 1997, now abandoned. U.S. Pat. No. 6,884,155 is a continuation-in-part of U.S. patent application Ser. No. 09/558,582, filed Apr. 26, 2000, now issued as U.S. Pat. No. 6,368,198, which is a continuation-in-part of U.S. patent application Ser. No. 09/447,620, filed Nov. 22, 1999, now abandoned, all of which are incorporated herein by reference.

FIELD OF THE INVENTION

The present invention relates generally to tools having diamond particles chemically bonded to a matrix support material, or a substrate, and arranged in a predetermined pattern. Accordingly, the present invention involves the fields of chemistry, metallurgy, and materials science.

BACKGROUND OF THE INVENTION

Abrasive tools have long been used in numerous applications, including cutting, drilling, sawing, grinding, lapping and polishing of materials. Because diamond is the hardest abrasive material currently known, it is widely used as a superabrasive on saws, drills, and other devices, which utilize the abrasive to cut, form, or polish other hard materials.

Diamond tools are particularly indispensable for applications where other tools lack the hardness and durability to be commercially practical. For example, in the stone industry, where rocks are cut, drilled, and sawed, diamond tools are about the only tools that are sufficiently hard and durable to make the cutting, etc., economical. If diamond tools were not used, many such industries would be economically infeasible. Likewise, in the precision grinding industry, diamond tools, due to their superior wear resistance, are uniquely capable of developing the tight tolerances required, while simultaneously withstanding wear sufficiently to be practical.

A typical superabrasive tool, such as a diamond saw blade, is manufactured by mixing diamond particles (e.g., 40/50 U.S. mesh saw grit) with a suitable metal support matrix powder (e.g., cobalt powder of 1.5 micrometer in size). The mixture is then compressed in a mold to form the right shape (e.g., a saw segment). This "green" form of the tool is then consolidated by sintering at a temperature between 700-1200° C. to form a single body with a plurality of abrasive particles disposed therein. Finally, the consolidated body is attached (e.g., by traditional brazing or soldering) to a tool body, such as the round blade of a saw, to form the final product.

Despite their prevailing use, diamond tools generally suffer from several significant limitations, which place unnecessary limits on their useful life. For example, the abrasive diamond or cubic boron nitride (CBN) particles are not distributed uniformly in the matrix that holds them in place. As a result, the abrasive particles are not positioned to maximize efficiency for cutting, drilling, grinding, polishing, etc.

The distance between diamond or CBN abrasive particles determines the work load each particle will perform. Improper spacing of the diamond or CBN abrasive particles typically leads to premature failure of the abrasive surface or structure. Thus, if the diamond/CBN abrasive particles are too close to one another, some of the particles are redundant and provide little or no assistance in cutting or grinding. In addition, excess particles add to the expense of production due the high cost of diamond and cubic boron nitride. Moreover, these non-performing diamond or CBN particles can block the passage of debris, thereby reducing the cutting efficiency. Thus, having abrasive particles disposed too close to one another adds to the cost, while decreasing the useful life of the tool.

On the other hand, if abrasive particles are spaced too far apart, the workload (e.g., the impact force exerted by the work piece) for each particle becomes excessive. The sparsely distributed diamond or CBN abrasive particles may be crushed, or even dislodged from the matrix into which they are disposed. The damaged or missing abrasive particles are unable to fully assist in the workload. Thus, the workload is transferred to the surviving abrasive particles. The failure of each abrasive particle causes a chain reaction which soon renders the tool ineffective to cut, drill, grind, etc.

Different applications may require different size of diamond (or cubic boron nitride) abrasive particles. For example, drilling and sawing applications may require a large sized (20 to 60 U.S. mesh) diamond grit to be used in the final tool. The metal substrate of the tool is typically selected from cobalt, nickel, iron, copper, bronze, alloys thereof, and/or mixtures thereof. For grinding applications, a small sized (60/400 U.S. mesh) diamond grit (or cubic boron nitride) is mixed with either metal (typically bronze), ceramic/glass (typically a mixture of oxides of sodium, potassium, silicon, and aluminum) or resin (typically phenolic).

Often the tool may include a matrix support material, such as a metal powder, which holds or supports the diamond particles. However, because diamond or cubic boron nitride is much larger than the matrix powder (300 times in the above example for making saw segments), and it is much lighter than the latter (about ⅓ in density for making saw segments), it is very difficult to mix the two to achieve uniformity. Moreover, even when the mixing is thorough, diamond particles can still segregate from metal powder in the subsequent treatments such as pouring the mixture into a mold, or when the mixture is subjected to vibration. The distribution problem is particularly troublesome for making diamond tools when diamond is mixed in the metal support matrix.

There is yet another limitation associated with the many methods of positioning diamond grits in a tool. Many times a metal bond diamond tool requires different sizes of diamond grits and/or different diamond concentrations to be disposed at different parts of the same diamond tool. For example, saw segments tend to wear faster on the edge or front than the middle. Therefore, higher concentrations and smaller diamond grit are preferred in these locations to prevent uneven wear and thus premature failure of the saw segment. These higher concentration/smaller size segments (i.e. "sandwich" segments) are difficult to fabricate by mixing diamond particles with metal powder. Thus, despite the known advantages of having varied diamond grit sizes and concentration levels, such configurations are seldom used because of the lack of a practical method of making thereof.

Another drawback of many diamond tools is that the abrasive particles, or "grits" are insufficiently attached to the tool substrate, or matrix support material, to maximize useful life of the cutting, drilling, polishing, etc., body. In fact, in most cases, diamond grits are merely mechanically embedded in the matrix support material. As a result, diamond grits are often knocked off or pulled out prematurely. Moreover, the grit may receive inadequate mechanical support from the loosely bonded matrix under work conditions. Hence, the diamond particles may be shattered by the impact of the tool against the workpiece to which the abrasive is applied.

It has been estimated that, in a typical diamond tool, less than about one tenth of the grit is actually consumed in the intended application (i.e. during actual cutting, drilling, polishing, etc). The remainder is wasted by either being leftover when the tool's useful life has expired, or by being pulled-out or broken during use due to poor attachment and inadequate support. Most of these diamond losses could be avoided if the diamond particles can be properly positioned in and firmly attached to the surrounding matrix.

In order to maximize the mechanical hold on the diamond grits, they are generally buried deep in the substrate matrix. As a result, the protrusion of the diamond particles above the tool surface is generally less than desirable. Low grit protrusion limits the cutting height for breaking the material to be cut. As a result, friction increases and limits the cutting speed and life of the cutting tool.

In order to anchor diamond grit firmly in the support matrix, it is highly desirable for the matrix to form carbide around the surface of the diamond. The chemical bond so formed is much stronger than the traditional mechanical attachment. The carbide may be formed by reacting diamond with suitable carbide formers such as a transition metal. Typical carbide forming transition metals are: titanium (Ti), vanadium (V), chromium (Cr), zirconium (Zr), molybdenum (Mo), and tungsten (W).

The formation of carbide requires that the carbide former be deposited around the diamond and that the two subsequently be caused to react to form carbide. Moreover, the non-reacted carbide former must also be consolidated by sintering or other means. All these steps require treatment at high temperatures. However, diamond may be degraded when exposed to a temperature above about 1,000° C. The degradation is due to either the reaction with the matrix material or the development of micro-cracks around metal inclusions inside the crystal. These inclusions are often trapped catalysts used in the formation of synthetic diamond.

Most carbide formers are refractory metals so they may not be consolidated below a temperature of about 1,200° C. Hence, refractory carbide formers are not suitable as the main constituent of the matrix support material.

There are, however, some carbide formers that may have a lower melting temperature, such as manganese (Mn), iron (Fe), silicon (Si), and aluminum (Al). However, these carbide formers may have other undesirable properties that prohibit them from being used as the primary constituent of the matrix support material. For example, both manganese and iron are used as catalysts for synthesizing diamond at high pressure (above 50 Kb). Hence, they can catalyze diamond back to graphite during the sintering of the matrix powder at a lower pressure. The back conversion is the main cause of diamond degradation at high temperature.

Aluminum, on the other hand, has a low melting point (660° C.), thus, making it easy to work with for securing the diamond particles. However, the melting point of aluminum can be approached when diamond grit is cutting aggressively. Hence, aluminum may become too soft to support the diamond grit during the cutting operation. Moreover, aluminum tends to form the carbide $Al_4C_3$ at the interface with diamond. This carbide is easily hydrolyzed so it may be disintegrated when exposed to coolant. Hence, aluminum typically is not a suitable carbide former to bond diamond in a matrix.

To avoid the high temperature of sintering, carbide formers, such as tungsten, are often diluted as minor constituents in the matrix that is made of primarily either Co or bronze. During the sintering process, there is a minimal amount, if any, of liquid phase formed. The diffusion of carbide former through a solid medium toward diamond is very slow. As a result, the formation of carbide on the surface of diamond is negligible. Therefore, by adding a carbide former as a minor matrix constituent, the improvement of diamond attachment is marginal at best.

In order to ensure the formation of carbide on the surface of diamond, the carbide former may be coated onto the diamond before mixing with the matrix powder. In this way, the carbide former, although it may be a minor ingredient in the matrix, can be concentrated around diamond to form the desired bonding.

The coating of diamond may be applied chemically or physically. In the former case, the coated metal is formed by a chemical reaction, generally at a relatively high temperature. For example, by mixing diamond with carbide formers such as titanium or chromium, and heating the mixture under a vacuum or in a protective atmosphere, a thin layer of the carbide former may be deposited onto the diamond. Increasing temperature may increase the thickness of the coating. The addition of a suitable gas (e.g. HCl vapor) that assists the transport of the metal may also accelerate the deposition rate. Alternatively, the coating may be performed in a molten salt.

In addition to sintering, infiltration is also a common technique for making diamond tools; in particular for drill bits and other specialty diamond tools that contain large (i.e. greater than U.S. mesh 30/40) diamond grit. Most commonly used infiltrants for these tools are copper based alloys. These infiltrants must flow and penetrate the small pores in the matrix powder. In order to avoid the diamond degradation at high temperature, the melting point of the infiltrant must be low. Hence, the infiltrant often contains a low melting point constituent, such as zinc (Zn). In addition to lowering the melting point of the infiltrant, the low melting point constituent also reduces the viscosity so the infiltrant can flow with ease. However, as most carbide formers tend to increase the melting point of the infiltrant, they are excluded from most infiltrants. As a result, these infiltrants cannot improve the bonding of diamond.

One specific process that has become dependent on the use of diamond tools is chemical mechanical polishing (CMP). This process has become standard in the semiconductor and computer industry for polishing wafers of ceramics, silicon, glass, quartz, etc. In general terms, the work piece to be polished is held against a spinning polishing pad of polyurethane, or other suitable material. The top of the pad holds a slurry of acid and abrasive particles, usually by a mechanism such as fibers, or small pores, which provide a friction force sufficient to prevent the particles from being thrown off of the pad due to the centrifugal force exerted by the pad's spinning motion. Therefore, it is important to keep the top of the pad as flexible as possible, and to keep the fibers as erect as possible, or to assure that there are an abundance of open and pores available to receive new abrasive particles.

A problem with maintaining the top of the pad is caused by an accumulation of polishing debris coming from the work piece, abrasive slurry, and polishing disk. This accumulation causes a "glazing" or hardening of the top of the pad, and significantly decreases the pad's overall polishing performance. Therefore, attempts have been made to revive the top of the pad by "combing" or "cutting" it with various devices. This process has come to be known as "dressing" or "conditioning" the CMP pad. The device most widely used for pad dressing is a disk with a plurality of super hard crystalline particles, such as diamond particles or cBN particles attached thereto.

Dressing disks made by conventional methods share several problems with other superabrasive tools, made by conventional methods. However, such issues may have a much greater impact on the CMP process. For example, poor superabrasive grit retention may lead to scratching and ruining of the work piece. Uneven work loading of the superabrasive grits resulting from clustered or unevenly spaced particle groups may cause overdressing of certain pad areas and under dressing of others, which results in unsuitable work piece polishing. Moreover, when the superabrasive particles of dressing disks do not extend to a uniform height above the substrate surface of the disk uneven dressing of the CMP pad is further propagated, because many particles from the dresser may not touch the pad.

In addition to the above-recited issues with particle retention and distribution, the CMP pad dressing process itself creates additional issues that make uncontrolled superabrasive particle placement unacceptable. For example, the downward pressing force of a dressing disk on a CMP may depress the pad upon contact with the leading edge of the dresser, and prevent the remaining superabrasive particles on the pad dresser from sufficiently contacting the pad to achieve even dressing.

Warping of the pad dresser working surface during the brazing process also often causes abrasive particles to dislodge. During the brazing process the pad dresser must be exposed to very high temperatures. Exposure to this extreme heat can cause the working surface of the pad dresser to warp, thus compromising the smoothness and planarity of the pad dresser's working surface. As a result, the braze portion of the working surface will be rough, having high and low spots. Such spots are undesirable, as they may cause the braze to begin flaking off, and making micro-scratches on the polished surface of the work piece.

As a result, suitable methods of maximizing the efficiency, useful life, and other performance characteristics of diamond tools are continually being sought.

SUMMARY OF THE INVENTION

It has been recognized by the inventor that it would be advantageous to develop a method for making diamond tools which meets the challenges discussed above.

In one aspect, the present invention resolves the problems set forth above by providing a method for forming metal bonded diamond or other superabrasive tools having a customized pattern of individual grit placement. Because the distribution of the diamond grits is controlled, the diamond grits can be disposed in detailed patterns which cause a specific pattern of tool wear, including uniform wear. Further, each superabrasive grit is more fully utilized, and there is no need for redundant superabrasive grits as a back up. Therefore, the cost of making the metal bond diamond or other superabrasive tools can be minimized by reducing the overall amount of superabrasive particles needed.

In accordance with another aspect of the present invention, the process involves providing a substrate, and then brazing a plurality of superabrasive particles directly to an exposed surface of the substrate in accordance with a predetermined pattern, thus chemically bonding the diamond particles in place on the substrate with a brazing alloy.

In one aspect of the invention, the brazing alloy may be provided as a layer of amorphous braze alloy, a powder, or rolled continuous film. The brazing alloy is chosen to contain an element which will chemically bond with the superabrasive particles and the support material, such as titanium, vanadium, chromium, zirconium, molybdenum, tungsten, manganese, iron, silicon, aluminum and mixtures or alloys of these elements. In a more detailed aspect of the present invention, the brazing alloy may be applied either before or after the superabrasive particles are affixed to the substrate. A wide variety of brazing alloys may be used in connection with the present invention to bond the diamond particles to the substrate. The brazing alloy should braze the superabrasive particles to the substrate at a temperature which avoids back-conversion of diamond to carbon. In a more detailed aspect of the present invention, the brazing is carried out at a temperature of less than about 1,100° C.

The process of bonding the diamond particles to the substrate using the brazing alloy may be accomplished by a variety of methods. In one aspect, the brazing alloy may be applied to the exposed surface of the substrate, after the diamond particles have been distributed thereon. The brazing alloy is then heated to a temperature sufficient to braze (i.e. chemically bond) the diamond particles to the substrate. This same principle applies when the diamond particles are used in connection with a matrix support material rather than, or in addition to a substrate. In another aspect, the brazing alloy may be first placed on the exposed surface of the substrate or matrix support material, and the diamond particles are then distributed on or in the brazing alloy in accordance with a predetermined pattern. Heating to a temperature sufficient to attain chemical bonding of the diamond particles to the substrate or matrix support material then ensues.

The arrangement of the diamond particles in a predetermined pattern on the matrix support material may be accomplished by a variety of methods. However, in one aspect, such a process includes using a template having a plurality of apertures in a desired pattern. Typically, the template is placed on the surface where the diamond particles are to be affixed, and the apertures are filled with diamond particles. As the particles fill the apertures, they may be subjected to pressure or otherwise held in place on the desired surface using an organic binder or adhesive. Next, the template may be removed, and depending on the requirements of the tool being formed, the diamond particles may be further adjusted on the surface of the substrate. Because of the template, the particles are each positively planted or positioned, at specific locations and held according to a predetermined pattern on the substrate or matrix support material. In a more detailed aspect, a plurality of substrate or matrix support material layers with diamond particles thereon or therein, may then be bonded together to form a tool having a three dimensional arrangement of diamond or other superabrasive particles in accordance with a predetermined pattern.

In another aspect of the present invention, the superabrasive particles may also be affixed to a transfer plate and then transferred to the substrate. In one aspect of this embodiment, the transfer plate can be made of metal or plastic, and may be flexible or rigid. The affixing of superabrasive particles to the transfer plate can be facilitated by coating the transfer plate with a thin layer of adhesive. The template is then used to distribute the superabrasive particles onto the transfer plate in the desired predetermined pattern. The transfer plate having superabrasive particles adhered thereto on one side is pressed against the substrate or matrix material. The superabrasive particles are transferred to the matrix support layer by adhering to an adhesive coated on the surface of the matrix support material. For ease of processing, the adhesive coated on the substrate preferably adheres the superabrasive particles more strongly than the adhesive coated on the transfer plate.

Next, the brazing alloy sheet is placed on top of the substrate having abrasive particles adhered thereto. Alternatively, a brazing powder may be sprinkled on the surface of the substrate having superabrasives affixed thereto. In an alternative aspect of the present invention, a slurry of brazing powder may be formed and then applied to the substrate or matrix support material having superabrasives adhered thereto, for example, by spraying, pasting, etc.

In one variation of the transfer plate method, the transfer plate is a sheet of amorphous braze which then becomes part of the final tool. A plurality of superabrasives may be affixed to the sheet of amorphous braze using an adhesive, or otherwise held in place, in a predetermined pattern. The sheet of amorphous braze having superabrasives affixed thereon is then placed on a substrate. In a more detailed aspect of this embodiment of the present invention, a template is used to create a specific pattern of superabrasives on the sheet of amorphous braze in a similar manner as when affixing the superabrasives to a substrate. The apertures of the template are configured to admit one superabrasive particle in each aperture. Once all the apertures have been filled with superabrasive particles, any excess particles are removed, and the abrasive particles are pressed into the sheet of amorphous braze to embed them therein, by using a generally flat surface such as a steel plate. Alternatively, rather than pressing the particles into the brazing alloy sheet, they may be held in place by a tacky substance, or adhesive, such as a glue, or other polymeric resin. The template is then removed and sheet of brazing alloy containing the abrasive particles is placed on or affixed to a substrate with an adhesive, for example acrylic glue. Finally, the whole assembly is brazed in a vacuum furnace to complete the brazing process and firmly fix the abrasive particles to the substrate or matrix support material. In one aspect of the invention, the flexible sheet of brazing alloy may also be affixed to the substrate or matrix support material prior to introduction of the abrasive particles.

The arrangement of apertures used in the template may be configured in a wide variety of patterns, including those determined to maximize tool performance during specific applications. In one aspect, the pattern of apertures, and thus the resulting predetermined pattern of diamond particles, may be a uniform grid. In another aspect the superabrasive particles may be disposed in varied concentration patterns to compensate for uneven wear. Thus, the diamond distribution for the cutting edge of a saw may have a greater distribution of diamond particles on the lead edge and sides than on the middle portion which is generally subjected to less wear. Likewise, the sizes of the superabrasive particles can be controlled to provide a cutting, grinding, etc., surface which is tailored to the particular uses and wear patterns for the tool.

In another aspect of the present invention a matrix support material may be used that consists solely, or essentially, of a sheet of amorphous brazing alloy. As such, the superabrasive particles can be distributed or planted in the sheet of brazing alloy. The superabrasive embedded sheet of brazing alloy can then be bonded directly to a tool substrate or matrix support material. Alternatively, the superabrasive particles may be glued to a tool substrate or matrix support material using a suitable binder. Then the sheet of brazing alloy may then be applied to the substrate or matrix support material, and the assembly is heated above the melting point of the braze. Thus the molten braze can chemically bond with the superabrasive particles and the substrate or matrix support material. In another alternative embodiment the sheet of brazing alloy having superabrasive particles is layered with a thin layer of unmelted metal.

In accordance with still yet another aspect of the present invention, the matrix support material may contain ingredients designed to enhance certain properties. For example, hard materials such as tungsten, tungsten carbide and silicon carbide may be added to increase wear resistance. Soft materials, such as molybdenum sulfide, copper, and silver, may also be added as solid lubricants.

In a yet more detailed aspect of the present invention, after heating the assembly of brazing alloy and abrasive particles, a layer of overlay material may be affixed to the working surface of the brazing alloy to create a smooth working surface. Because of the molten state and surface tension that the brazing alloy sheet endures during the heating process, the finally formed working surface thereof may be quite rough, containing many jagged points that are easily flaked off during use. This is of particular concern during fine polishing and dressing applications where the workpiece may be damaged as a result of loose particulates. The overlay material has a predetermined thickness, so as not to interfere with the polishing or dressing capabilities of the abrasive particles. In addition, the overlay material generally comprises any one of many metallic substances, such as nickel, tungsten, cobalt, chromium, or a zirconium nickel alloy. The overlay material may be applied by several methods, but in certain aspects, may be applied by either electroplating or physical vapor deposition (PVD) processes.

In another aspect of the present invention, a thin coating of optional anti-corrosive material may also be applied to the diamond tool following the brazing process. Addition of the anti-corrosive material effectively "seals" the working surface of the tool. Thereby protecting the abrasive particles, the brazing alloy, and/or the overlay material from chemical attack by various chemicals and/or coolants found in actual use of the tool. The anti-corrosive material generally includes a super-abrasive material, such as diamond-like carbon, or amorphous diamond. Similar to the overlay material, the anti-corrosive layer may have a predetermined thickness, so as effectively seal the working surface of the tool without interfering with the performance of the abrasive particles.

Yet another important aspect of the present invention is the ability to specifically control the placement of various superabrasive particles on the surface of the tool. Thus, for example, several sheet segments may be assembled to form a tool precursor (see FIGS. 6A through 9 and 12C) for heat and pressure processing. Each segment is assembled by providing a thin layer of unmelted metal and disposing superabrasive grits on the layer in a predetermined pattern. After the diamond particles are placed onto the thin layer of metal according to a predetermined pattern, a sheet of amorphous brazing alloy is placed on the superabrasive particles to form a superabrasive layer sheet segment. The process may be repeated until a desired number of layers have been formed. These layers are then assembled to form the desired three-dimensional body. Subsequently the diamond tool is consolidated (e.g., by sintering or infiltration) to form the final product. By assembling substantially two-dimensional segments to form a three-dimensional body, the distribution of diamond grit in a tool can be positively controlled. Thus, diamond concentration in different parts of the same tool may be adjusted (see FIGS. 6A through 9). Such a control of diamond distribution is highly desirable to improve the wear characteristics of the tool. For example, the sides of a diamond saw blade are often worn faster then the center, so it is advantageous to add more diamond grit on the sides (see FIG. 6B). The layers can be of uniform distribution pattern and concentration, or of differing distribution patterns, concentrations and/or particle size.

By assembling layers of metal matrix having superabrasives thereon in a predetermined pattern and concentration into a three dimensional body, the present invention not only provides the desirable diamond distribution pattern in the tool body, but also provides the flexibility for possible manipulation of diamond concentration at different parts of the same tool body. Thus, for example, diamond particles can be disposed in denser concentrations in some layers than others, and the layers with the greater diamond concentrations can be disposed within the three-dimensional structure created in such a manner as to prevent the uneven wear patterns that are typical in many prior art abrasive tools.

Another example of the importance of improving the performance of abrasive tools by employing a specific pattern or design of abrasive particles is in dressing applications. As indicated above, the use of a template allows the positioning or placement of abrasive particles, each at specific locations in accordance with a predetermined pattern. In one aspect, such patterns may be designed to present specific gaps or configurations that enhance the grooming of a CMP pad. For example, the working surface of the CMP pad dresser may be configured to facilitate the rising of the CMP pad under an interior, or central portion of the dresser, rather than only along an outside or "leading edge" thereof. Such additional rising allows the dresser to more effectively cut into and groom the pad.

Use of the template also provides the ability to uniformly space the abrasive particles on the substrate. Uniform spacing and uniform size of each abrasive particle is ensured through the use of a template as described above. Further, the use of a brazing alloy in a sheet or cut out with an even surface, in connection with uniformly sized abrasive particles that are adhered thereto, allows the creation of a uniform height between the abrasive particles.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

Additional features and advantages of the invention will be apparent from the detailed description which follows, taken in conjunction with the accompanying drawings, which together illustrate, by way of example, features of the invention.

DETAILED DESCRIPTION

Figure 1:
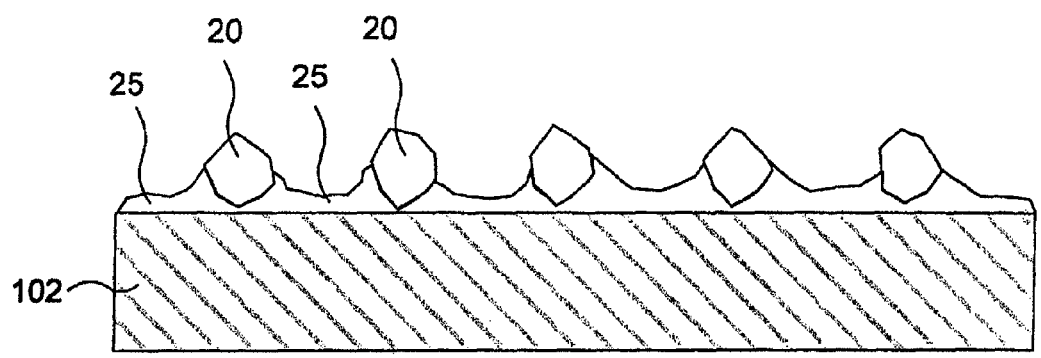
FIG. 1 is a side view of a final tool segment produced in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features, process steps, and materials illustrated herein, and additional applications of the principles of the inventions as illustrated herein, which would occur to one skilled in the relevant art and having possession of this disclosure, are to be considered within the scope of the invention. It should also be understood that terminology employed herein is used for the purpose of describing particular embodiments only and is not intended to be limiting.

A. Definitions

In describing and claiming the present invention, the following terminology will be used.

The singular forms "a," "an," and "the" include plural referents unless the context clearly dictates otherwise. Thus, for example, reference to "a matrix material" includes reference to one or more of such materials, and reference to "an alloy" includes reference to one or more of such alloys.

As used herein, "substantially free of" refers to the lack of an identified element or agent in a composition. Particularly, elements that are identified as being "substantially free of" are either completely absent from the composition, or are included only in amounts which are small enough so as to have no measurable effect on the composition.

As used herein, "predetermined pattern" refers to a non-random pattern that is identified prior to construction of a tool, and which individually places or locates each superabrasive particle in a defined relationship with the other diamond particles, and with the configuration of the tool. For example, "positively planting particles in a predetermined pattern" would refer to positioning individual particles at specific non-random and pre-selected positions. Further, such patterns are not limited to uniform grid patterns but may include any number of configurations based on the intended application.

As used herein, "amorphous braze" refers to a homogenous braze composition having a non-crystalline structure. Such alloys contain substantially no eutectic phases that melt incongruently when heated. Although precise alloy composition is difficult to ensure, the amorphous brazing alloy as used herein should exhibit a substantially congruent melting behavior over a narrow temperature range.

As used herein, "uniform grid pattern" refers to a pattern of diamond particles that are evenly spaced from one another in all directions.

As used herein, "irregularly shaped" refers to a shape that is not a standard geometric shape, e.g. shapes that are not round, oval, square, etc.

As used herein, "matrix," "matrix support material," "matrix support layer," and "matrix material," may be used interchangeably, and refer to a non-sintered particulate material to which superabrasive particles may be bonded. Notably, sintering or consolidation of the particulate material may occur during a process of chemically bonding superabrasive particles thereto. In one aspect, the superabrasive particles may be bonded or fixed to a surface of the matrix. In another aspect, the superabrasive particles may be fixed or planted into the matrix. In yet another aspect, the matrix material may take the shape of a tool body. In a further aspect, the matrix material may take the shape of a sheet having a specified thickness.

As used herein, "substrate" refers to a solid metal material. While many solid metal materials may be a product of metal particulate sintering or consolidation, it is to be understood, that as used herein, "substrate" does not include powdered or particulate metal materials that have not yet been sintered or consolidated into a solid mass or form.

As used herein, "alloy" refers to a solid or liquid mixture of a metal with a second material, said second material may be a non-metal, such as carbon, a metal, or an alloy which enhances or improves the properties of the metal.

As used herein, "metal brazing alloy," "brazing alloy," "braze alloy," "braze material," and "braze," may be used interchangeably, and refer to a metal alloy which is capable of chemically bonding to superabrasive particles, and to a matrix support material, or substrate, so as to substantially bind the two together. The particular braze alloy components and compositions disclosed herein are not limited to the particular embodiment disclosed in conjunction therewith, but may be used in any of the embodiments of the present invention disclosed herein.

As used herein, the process of "brazing" is intended to refer to the creation of chemical bonds between the carbon atoms of the superabrasive particles and the braze material. Further, "chemical bond" means a covalent bond, such as a carbide or boride bond, rather than mechanical or weaker inter-atom attractive forces. Thus, when "brazing" is used in connection with superabrasive particles a true chemical bond is being formed. However, when "brazing" is used in connection with metal to metal bonding the term is used in the more traditional sense of a metallurgical bond. Therefore, brazing of a superabrasive segment to a tool body does not require the presence of a carbide former.

As used herein, "superabrasive particles" and "superabrasive grits" may be used interchangeably, and refer to particles of either natural or synthetic diamond, super hard crystalline, or polycrystalline substance, or mixture of substances and include but are not limited to diamond, polycrystalline diamond (PCD), cubic boron nitride (CBN), and polycrystalline cubic boron nitride (PCBN). Further, the terms "abrasive particle," "grit," "diamond," "PCD," "CBN," and "PCBN," may be used interchangeably.

As used herein, in conjunction with the brazing process, "directly" is intended to identify the formation of a chemical bond between the superabrasive particles and the identified material using a single brazing metal or alloy as the bonding medium.

As used herein, "precursor" refers to an assembly of superabrasive particles, substrate or matrix support material, and/or a braze alloy. A precursor describes such an assembly prior to the brazing and/or sintering process, i.e. such as a "green body".

As used herein, "aperture" refers to an opening through a template surface which has a predetermined size and shape depending on the intended application. For example, the aperture size may be designed to accommodate a plurality of superabrasive particles of a given mesh size. However, it is often desirable to design the apertures such that only one superabrasive particle is accommodated by each aperture.

As used herein, "euhedral" means idiomorphic, or having an unaltered natural shape containing natural crystallographic faces.

As used herein, "sharp portion" means any narrow apex to which a crystal may come, including but not limited to corners, ridges, edges, obelisks, and other protrusions.

As used herein, "metallic" means any type of metal, metal alloy, or mixture thereof, and specifically includes but is not limited to steel, iron, and stainless steel.

As used herein with respect to distances and sizes, "uniform" refers to dimensions that differ by less than about 75 total micrometers.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

For example, a concentration range of about 1% w/w to about 4.5% w/w should be interpreted to include not only the explicitly recited concentration limits of 1% w/w to about 4.5% w/w, but also to include individual concentrations such as 2% w/w, 3% w/w, 4% w/w, and sub-ranges such as 1% w/w to 3% w/w, 2% w/w to 4% w/w, etc. The same principle applies to ranges reciting only one numerical value, such as "less than about 4.5% w/w," which should be interpreted to include all of the above-recited values and ranges. Further, such an interpretation should apply regardless of the breadth of the range or the characteristic being described.

B. The Invention

Reference will now be made to the drawings in which the various elements of the present invention will be given numeral designations and in which the invention will be discussed. It is to be understood that the following description is only exemplary of the principles of the present invention, and should not be viewed as narrowing the appended claims.

Referring now to FIG. 1, a plurality of superabrasive particles 20 are brazed to an exposed surface of substrate 102 in accordance with a predetermined pattern. A braze material 25 is used to braze or bond the superabrasive particles to the substrate. In keeping with the present invention, a variety of methods may be used to obtain the desired results and are discussed in more detail below.

The substrate may include a variety of materials, such as various metals. Examples of specific metals include without limitation, cobalt, nickel, iron, copper, carbon, and their alloys or mixtures (e.g. tungsten or its carbide, steel, stainless steel, bronze, etc). The present invention is useful for a variety of diamond tools such as for grinding, polishing, cutting, dressing or any tool used to remove material from a workpiece. For example, saws are not limited to, but may include, circular saws, straight blades, gang saws, reciprocating saws, frame saws, wire saws, thin-walled cutoff saws, dicing wheels, and chain saws. In another aspect, the diamond tool may be a CMP pad conditioner.

Typically, the substrate has an exposed surface upon which the superabrasive particles are to be affixed and may be substantially flat or contoured and may have multiple faces, such as in some drill bits or circular saws. However, in one embodiment of the present invention, the superabrasives may be bonded to a matrix support material rather than directly to a substrate. The matrix support material may either be sufficiently configured to act as a tool body, or may be further coupled to a substrate to form a complete tool.

In another alternative embodiment, the abrasive particles may be temporarily affixed to a substrate with an acrylic glue, or other adhesive using the template as described below in order to prevent movement during the brazing process. Most common adhesives will vaporize at temperatures above about 400° C. and do not chemically react with the braze alloy or superabrasive particles.

The brazing alloy of the present invention may be provided as a thin sheet, powder, or continuous sheet of amorphous braze alloy. There are many ways that the brazing alloy can be provided in accordance with the present invention. For example, a brazing alloy powder can first be mixed with a suitable binder (typically organic) and a solvent that can dissolve the binder. This mixture is then blended to form a slurry or dough with a proper viscosity. In order to prevent the powder from agglomeration during the processing, a suitable wetting agent (e.g., menhaden oil, phosphate ester) may also be added. The slurry may then be sprayed or otherwise applied to the matrix support material and/or superabrasive particles. In another embodiment, the slurry can then be poured onto a plastic tape and pulled underneath a blade or leveling device. By adjusting the gap between the blade and the tape, the slurry can be cast into a plate with the desired thickness. The tape casting method is a well-known method for making thin sheets out of powdered materials and works well with the method of the present invention.

The brazing alloy may also be provided as a sheet of amorphous brazing alloy. The sheet of amorphous brazing alloy may be flexible or rigid and may be shaped based on the desired tool contours. This sheet of brazing alloy also aids in the even distribution of the braze over the surface of the tool. The sheet of brazing alloy contains no powder or binder, but rather is simply a homogenous braze composition. Amorphous brazing alloys have been found to be advantageous for use in the present invention, as they contain substantially no eutectic phases that melt incongruently when heated. Although precise alloy composition is difficult to ensure, the amorphous brazing alloy used in the present invention should exhibit a substantially congruent melting behavior over a relatively narrow temperature range. Thus, during the heating portion of the brazing process the alloy does not form grains or a crystalline phase in substantial quantities, i.e. via vitrefication. Further, the melting behavior of the amorphous braze alloy is distinct from sintering which requires the reduction or elimination of voids between particles of alloy material which does not exist in the amorphous form of the alloy. However, the originally amorphous braze may form non-homogeneous phases during crystallization via the slower cooling process. Generally, amorphous alloys are formed by quickly quenching the liquid into a solid to avoid localized crystallization and variations in composition. Notably, in each of the processes recited herein, the brazing alloy may be presented as either a sheet, film, or other punched out layer that corresponds to the desired tool segment shape.

Alternatively, a powdered brazing alloy can be mixed with a suitable binder and its solvent to form a deformable cake. The cake can then be extruded through a die with a slit opening. The gap in the opening determines the thickness of the extruded plate. Alternatively, the material can also be drawn between two rollers with adjustable gap to form sheets with the right thickness. In another aspect, the braze powder may be showered directly onto diamond particles and substrate as more fully elaborated below.

It is desirable to make the sheets pliable for subsequent treatments (e.g., bending over the tool substrate). Therefore, a suitable organic plasticizer can also be added to provide the desired characteristics.

The use of organic agents for powder (metal, plastics, or ceramics) processing is documented in many textbooks and it is well known by those skilled in the art. Typical binders include polyvinyl alcohol (PVA), polyvinyl butyral (PVB), polyethylene glycol (PEG), paraffin, phenolic resin, wax emulsions, and acrylic resins. Typical binder solvents include methanol, ethanol, acetone, trichlorethylene, toluene, etc. Typical plasticizers are polyethylene glycol, diethyl oxalate, triethylene glycol dihydroabietate, glycerin, octyl phthalate. The organic agents so introduced are to facilitate the fabrication of metal layers. They must be removed before the consolidation of metal powders. The binder removal process (e.g., by heating in a furnace with atmospheric control) is also well known to those skilled in the art.

In one aspect, the brazing alloy may be substantially free of zinc, lead, and tin. One commercially available powdered braze alloy, which is suitable for use with the present invention, is known by the trade name NICROBRAZ LM (7 wt % chromium, 3.1 wt % boron, 4.5 wt % silicon, 3.0 wt % iron, a maximum of 0.06 wt % carbon, and balance nickel), made by Wall Colmonoy Company, Madison Heights, Mich. Other suitable alloys included copper, aluminum, and nickel alloys containing chromium, manganese, titanium, and silicon. In one aspect, the brazing alloy may include chromium. In another aspect, the brazing alloy may include a mixture of copper and manganese. In an additional aspect, the amount of chromium, manganese, and silicon may be at least about 5 percent by weight. In another aspect, the alloy may include a mixture of copper and silicon. In yet another aspect, the alloy may include a mixture of aluminum and silicon. In a further aspect, the alloy may include a mixture of nickel and silicon. In another aspect, the alloy may include a mixture of copper and titanium.

Preferably, the diamond braze contains at least 3% by weight of a carbide forming member selected from the group consisting of chromium, manganese, silicon, titanium, and aluminum, and alloys and mixtures thereof. Additionally, the diamond braze should have a liquidus temperature of less than 1,100° C. to avoid damage to the diamond during the brazing process. One commercially available sheet of amorphous brazing alloy which melts at a sufficiently low temperature is an amorphous brazing alloy foil (MBF) manufactured by Honeywell having the NICROBRAZ LM composition. These foil sheets are about 0.001" thickness and typically melt at between about 1,010° C. and about 1,013° C.

In one aspect, the brazing process may be carried out in a controlled atmosphere, such as under a vacuum, typically about $10^{-5}$ torr, an inert atmosphere (e.g., argon (Ar) or nitrogen ($N_2$)), or a reducing atmosphere (e.g., hydrogen ($H_2$)). Such atmospheres may increase the infiltration of the brazing alloy into the matrix support material, and therefore, enhance the diamond-braze and matrix-braze bonding.

Figure 2:
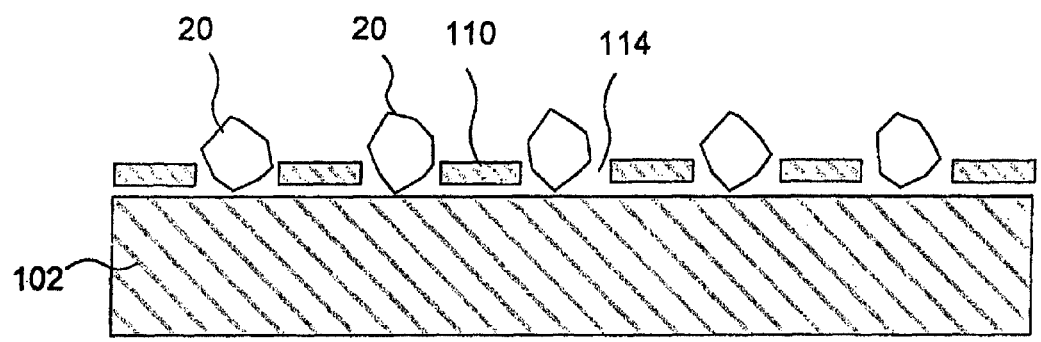
FIG. 2 is a side view of a segment showing placement of superabrasive particles using a template.

Referring now to FIG. 2, a substrate 102 is selected and a template 110 is laid on the top of the substrate. The template 110 contains apertures 114 that are larger than one superabrasive particle, but smaller than two abrasive particles, thereby allowing a single particle of the abrasive to be disposed at each specific location. The thickness of the template is preferably between ⅓ to ⅔ of the height of the average abrasive particle. However, other thicknesses may be used if appropriate accommodations are made for seating the abrasive particles in the desired locations. In some aspects, the thickness of the template may be up to two (2) times the height of the abrasive particles. An adhesive may be applied to the surface of the substrate to hold the superabrasive particles in place during the brazing process.

After the template 110 is properly positioned, a layer of abrasive particles 20 is then spread over the template so that each aperture 114 receives an abrasive particle. Those particles not falling into the apertures in the template are removed by tilting the substrate, sweeping the template with a broom, or some other similar method. Optionally, a generally flat surface, such as a steel plate, may then be laid over the superabrasive particles, which rest in the apertures in the template. The flat surface presses the superabrasive particles to seat the particles. The pressed particles are therefore firmly attached to the substrate by either slight mechanical impression into the substrate, or into a braze layer (not shown), or adhesive layer (not shown) which was applied to the exposed surface of the substrate prior to placing the superabrasive particles thereon. The template 110 is then removed such that the superabrasive particles 20 remain in place on the substrate 102 in accordance with the predetermined pattern of the template.

Figure 3:
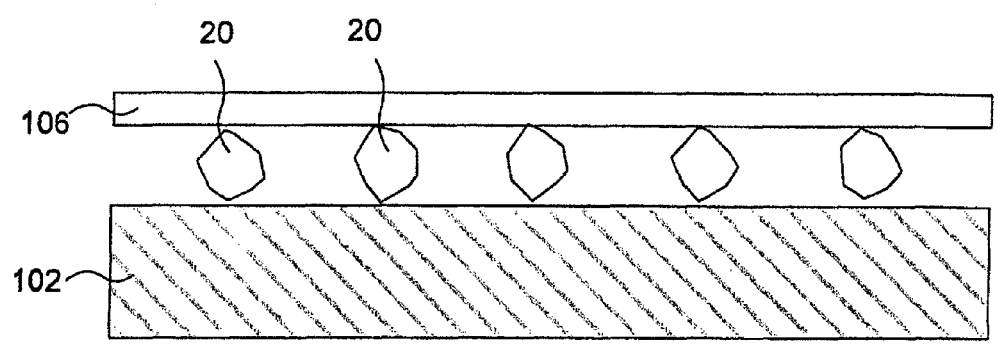
FIG. 3 is a side view of a segment showing a method of placing superabrasive particles on a substrate using a transfer plate.

Alternatively, as shown in FIG. 3, the substrate may be a transfer plate 106 onto which the superabrasive particles 20 are affixed to one side using a thin adhesive film (not shown). Optionally, the same methods as described above with regard to using a template 110 to achieve a particular pattern of superabrasive particles may be used to effect particle placement. The transfer plate 106 having superabrasive particles 20 affixed thereon is then pressed against a substrate 102. The transfer plate may be made of metal or plastic, however it has been found that a transparent plastic transfer plate increases ease of use and facilitates monitoring of the process. Affixing of the particles to the transfer plate may be accomplished using any adhering means, such as an adhesive. In order to facilitate transfer of the superabrasive particles to the substrate 102 an adhesive layer (not shown) which adheres the particles 20 more strongly to the substrate 102 than to the transfer plate can be used. The transfer plate is then removed and treatment such as adding a braze to form a tool precursor and heating to produce the final product may be performed. Therefore, the abrasive particles are transferred to the substrate in the pattern dictated by the template.

Figure 4:
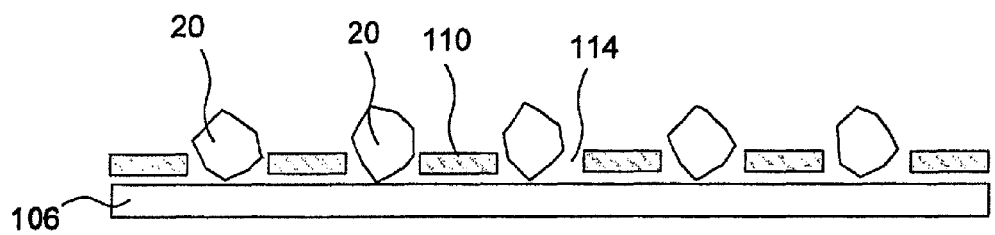
FIG. 4 is a side view of a segment showing an alternative method of forming a pattern of superabrasive particles.

In another alternative embodiment, the transfer sheet 106 may be a sheet of amorphous brazing alloy. In a similar process to that described above, the superabrasive particles 20 are affixed to a substrate. First, a template 110 having apertures 114 is placed upon a sheet of brazing alloy 106, as illustrated in FIG. 4. In one aspect of the present invention, the sheet may be a sheet or film of continuous amorphous brazing alloy, as described above. The use of the template allows controlled placement of each abrasive particle at a specific location by designing the template with apertures in a desired pattern.

After the template 110 is place on the brazing alloy sheet, the apertures 114 are filled with abrasive particles 20. The apertures have a predetermined size, so that only one abrasive particle will fit in each. Any size of abrasive particle, or grit is acceptable, however in one aspect of the invention, the particle sizes may be from about 100 to about 350 micrometers in diameter. Although various aperture sizes and shapes would restrict access to one particle per aperture, the apertures of the present invention may be designed for very careful placement of the superabrasive particles. Thus, for average particle sizes of 100 micrometers the apertures could be designed about 150 micrometers across.

In another aspect of the invention, the size of the apertures in the template may be customized in order to obtain a pattern of abrasive particles having a size within a uniform size range. In one particular embodiment of CMP pad dressing, the apertures of the template are sufficient to select only grits within a size range having a variance no greater than 50 micrometers. This uniformity of grit size contributes to the uniformity of CMP pad dressing, as the workload of each abrasive particle is evenly distributed. In turn, the even workload distribution reduces the stress on individual abrasive particles, and extends the effective life of the CMP pad dresser. In various superabrasive tools, the template may take a wide variety of configurations. The patterns may include various arrangements, as well as, include multiple size apertures to accommodate differing size superabrasive particles in the same tool in which case the larger particles would be applied first followed by the smaller particles.

After the apertures of the template are all filled with superabrasive particles, any excess abrasive particles are removed, and optionally a flat surface is applied to the abrasive particles. The flat surface should be of an extremely strong, rigid material, so that it is capable of pushing abrasive particles down into the brazing alloy sheet or film 106. Such materials typically include, but are not limited to steel, iron, alloys thereof, etc.

After removing the template, the flat surface may be used again to press the abrasive particles firmly into the sheet of brazing alloy. While a flat surface is preferable, those skilled in the art will appreciate that there may be occasions when it is desirable to have some of the abrasive particles extend outwardly from the final tool more than other abrasive particles. In such situations, a contoured or otherwise shaped surface could be used to seat some of the abrasive particles deeper into the sheet of brazing alloy, than other particles. The abrasive particles will thus extend away from the substrate to a predetermined height.

While the method described above to press the superabrasive particles into the brazing alloy is preferred for many applications, there are instances where it is desirable to have the abrasive particles extend outwardly from the sheet of brazing alloy. For example, some tools may only have one layer of abrasive. This can be accomplished simply by leaving the template 110 in place when pressing the superabrasives using a flat surface, and not further pressing the particles into the brazing alloy once the template has been removed.

Figure 5:
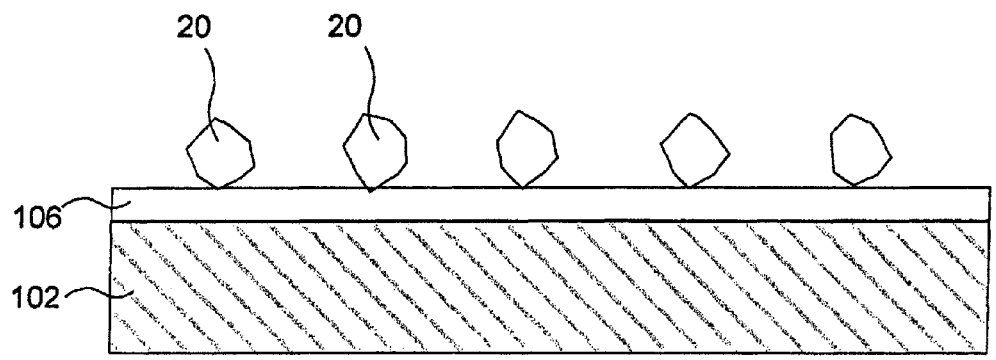
FIG. 5 is a side view of a precursor segment showing a possible placement of the braze alloy.

In the alternative, the sheet or film of brazing alloy in FIGS. 3 through 5 is formed to be of a lesser thickness than the cross-sectional thickness or diameter of the superabrasive particles 20. When the particles are pressed into the sheet 106, the thickness of the sheet forces the particles to protrude from the sheet of brazing alloy. The sheet is then applied to the matrix support material in a manner discussed above.

In creating the predetermined pattern of the present invention, the spacing of the apertures in the template, while non-random, need not be uniform. Rather, variations in spacing can be provided to facilitate different concentrations on various areas to facilitate different concentrations on various portions of the sheet of amorphous brazing alloy. Likewise, by controlling the size of the apertures and the order in which the diamond particles are placed in the apertures, a single layer could be provided with particles of different sizes.

In a more detailed aspect of the present invention, superabrasive particle height may be important in CMP pad dresser performance. A uniform particle height can be determined by the thickness of the template 110, and in a preferred embodiment, each abrasive particle will extend to within 50 micrometers of this distance. As such, each abrasive particle grooms to substantially the same depth on the CMP pad. However, it is to be understood that in certain applications, grit height may not be desired to be uniform. As such, those of ordinary skill in the art will recognize that grit patterns of varied height may be provided by so configuring the template, and the surface used to press the particles to provide such a design.

Abrasive particles 20 as shown in FIGS. 1-12C are various shapes. The scope of the present invention encompasses abrasive particles of any shape, including euhedral, or naturally shaped particles. However, in one embodiment, the abrasive particles have a predetermined shape with a sharp point extending in a direction away from the substrate.

In an alternative embodiment, rather than pressing the abrasive particles into the sheet of brazing alloy, they may be fixed in the templated position by disposing an adhesive on the surface of the sheet of brazing alloy. In this manner, the particles remain fixed in place when the template is removed, and during heat processing.

While the use of the sheet of amorphous brazing alloy 106 been discussed with respect to the patterned distribution of superabrasive particles, it is equally applicable to the random distribution of diamond particles on a matrix support material. Thus, the superabrasive particles may be distributed on either the sheet of brazing alloy or a matrix support material without the use of a template or otherwise creating a predetermined pattern. Similar methods and arrangements could be employed as described above in connection with the use of a template.

After the superabrasive particles are at least partially embedded in, or adhered to, the sheet of brazing alloy 106, the sheet is affixed to the substrate 102 as shown in FIG. 5. Alternatively, in some embodiments, the sheet of brazing alloy may be first affixed to the substrate, and the abrasive particles subsequently added thereto using the template procedure described herein. In another alternative embodiment, the sheet of brazing alloy having superabrasive particles affixed thereto is applied to the exposed surface of the substrate in such a manner that the superabrasive particles are oriented between the sheet and the substrate as shown in FIG. 3.

The brazing alloy used in several embodiments of the present invention may be any brazing material known in the art, but in one aspect, may be a nickel alloy that has a chromium content of at least about 2% by weight. A brazing alloy of such a composition will be nearly super hard in and of itself, and less susceptible to chemical attack from solutions used in various applications such as an abrasive containing slurry. In such an embodiment, additional anticorrosive layers or overlay material would be optional.

Because the abrasive particles are firmly held in, or on the sheet of brazing alloy, the surface tension of the liquid brazing alloy is insufficient to cause particle clustering during the brazing process. Additionally, braze thickening occurs to a much lesser degree and few or no "mounds" are formed. Rather, the braze 25 forms a slightly concave surface between each abrasive particle, due to the wetting action of the chemical bonding between the braze and the particles, which provides additional structural support, as shown in FIG. 1. In one embodiment, the thickness of the sheet of amorphous brazing alloy 106 is predetermined to allow at least about 10% to about 90% of each abrasive particle to protrude above the outer, or working, surface of brazing material. In another aspect, when an overlay material is used, the abrasive particles may be selected or placed, so that at least about 10% to about 90% of each abrasive particle protrudes above the outer, or working, surface of the overlay material.

In addition to the specific methods of embedding, or adhering the abrasive particles to the sheet of brazing alloy, those skilled in the art will recognize suitable alternative procedures, such as fixing the abrasive particles to the substrate, and then placing the braze thereon. In this case, the particles may be positioned on the substrate using the template method recited above, and held in place by glue, or other suitable binder. Alternatively, a powdered braze material is then showered, or placed on the substrate around the abrasive particles and heated to cause the braze material to form chemical bonds with the superabrasive particles and bond to the substrate.

Once the superabrasive particles and brazing alloy have been placed on the substrate, or matrix support material, to form a superabrasive tool precursor the precursor is heated to braze the superabrasives to the matrix support material. The selection of the brazing alloy is important and directly affects the final tool properties such as durability and strength. Although many types of brazing alloys are commercially available, the brazing alloys useful in connection with the present invention are limited. The brazing alloy should contain a carbide former as discussed above, such as titanium, vanadium, chromium, zirconium, molybdenum, tungsten, manganese, iron, silicon, aluminum, and mixtures or alloy thereof.

Of particular importance are chromium, manganese, silicon or alloys or mixtures thereof and have proven effective in the present invention. The carbide former may be present in the brazing alloy between about 2% and about 50% by weight of the brazing alloy. Examples of these brazes are NICROBRAZ LM (Ni—Cr—B—Si—Fe), manufactured by Wall Colmonoy Company (U.S.A.), with a melting range of 970-1000° C., and 21/80 (Cu—Mn—Ni), manufactured by Degussa (Germany), with a melting range of 970-990° C. Other possible brazes include: Cu—Mn alloy near the eutectic composition (about 25 wt % Mn) with a melting point of about 880° C.; Ni—Si alloy near the eutectic composition (about 50 wt % Si) with a melting point of about 970° C.; Cu—Si alloy near the eutectic composition (about 30 wt % Si) with a melting point of about 810° C.; Al—Si alloy near the eutectic composition (about 15 wt % Si) with a melting point of about 600° C.

The above-recited examples of diamond brazes cover a wide range of mechanical properties and infiltration or sintering temperatures (generally about 50° C. above the liquidus temperature). Various alloys of these brazes may also be used for further adjustments of brazing temperature and mechanical properties. The selection of diamond braze depends largely on the intended application. In general, more severe applications, such as sawing granite, concrete, or asphalt, would require a stronger diamond grit that may tolerate a higher temperature of brazing. Brazes which melt at higher temperatures are, in general, more wear resistant. On the other hand, less demanding applications, such as sawing limestone or marble, require lower strength diamond grit. Such a diamond is degraded easily at high temperature so it must be brazed at a lower temperature. Brazes of this type are typically less wear resistant.

Brazing material should be kept to a minimum in order to avoid completely covering the abrasive particles. This problem is compounded by the fact that typical brazing materials are mechanically very weak. This mechanical weakness offsets the strength of the chemical bonds created between the abrasive particles and the brazing material. In fact, when dislodgment occurs, the chemical bonds between the abrasive particles and the brazing material are strong enough that the brazing material itself will often shear off along with detached abrasive particles. The brazing material is also very susceptible to chemical attack by the abrasive slurry. This contributes to the detachment of abrasive particles, as it further weakens the brazing material, which is already mechanically weak.

While prior art brazes typically include metals which were designed to facilitate flow of the braze material, such as zinc, lead and tin, it has been found in accordance with the present invention that such materials actually impair the brazing process. The prior art materials are generally more volatile, and have a tendency to contaminate the vacuum or inert atmosphere used in infiltration. While very small amounts of the volatile metals will not significantly interfere with brazing, amounts over about 1 or 2 percent by weight can inhibit proper infiltration. As used herein, substantially free of volatile metals, or substantially free of zinc, etc. is used to characterize such a situation in which the volatile metal is present in sufficiently small amounts as to not provide any meaningful impediment to infiltration and brazing.

It is important that the brazing temperature be kept lower than the melting point of the substrate so the tool body can maintain the shape during the brazing of the superabrasive particles. Moreover, the brazing temperature must also be low enough to not cause diamond to degrade, typically less than about 1,100° C. For embodiments involving infiltration, a temperature typically 50° C. above the liquidus temperature of the braze alloy is required. In addition to control the brazing temperature, the brazing time should also be kept short so the braze will not react excessively with diamond or the substrate. In the former case, diamond may also be degraded. In the later case, the alloying with the surface of the substrate may raise the melting point of the diamond braze. As a result, the diamond braze may solidify gradually and eventually stop flowing. Also, a coarse braze powder will require longer heating times and/or temperatures.

An additional consideration in selection of a brazing alloy is that it should also wet the superabrasive particles and chemically bond with the superabrasives. Therefore, as the brazing alloy 25 bonds with the superabrasive particles the alloy creeps up the sides of the superabrasives as can be seen in FIG. 1. This wetting action is beneficial for several reasons including improved mechanical support for the particles, as well as the strong carbide bonds. Typically, a carbide former contained in a suitable solvent alloy meets this requirement. However, various carbide formers may be adversely impacted by the brazing atmosphere.

The atmospheric environment for brazing also may be controlled to provide superior performance. For example, if the braze material contains a strong attractor of oxygen or nitrogen, such as titanium, a high degree of vacuum ($10^{-6}$ torr maximum), or a dew point below $-60°$ C., must be maintained during the brazing process. This restraint often adds unnecessary costs to manufacturing of diamond bond tools. The presence of minute amounts of oxygen may oxidize the carbide former and prevent the formation of carbide bonds with the diamond. On the other hand, if the braze material contains a less sensitive getter, such as chromium and manganese, a lower degree of vacuum ($10^{-5}$ torr minimum) or a hydrogen atmosphere may be adequate for brazing. However, if the carbide former reactivity is too low, such as with cobalt or nickel, minimal carbide bonds will be formed with the diamond particles. Hence there is a compromise in selection of carbide formers between the ability to bond with diamond and the tendency to oxidize.

After brazing, the produced part (e.g., a saw segment) may be trimmed (e.g., by grinding) to the finished dimension. It can then be mounted (e.g., by conventional brazing) onto a tool body (e.g., a round steel blade) to make a finished product.

As discussed above, this invention uses a diamond braze that wets the matrix support material of a diamond tool. Most diamond brazes can wet easily common matrix support materials with major constituents of cobalt, nickel, iron, copper or bronze, so the brazing may proceed smoothly. Referring again to FIG. 1, typically, the final diamond tool produced in accordance with the method of the present invention includes diamond particles 20 having carbide bonds with a component of the braze alloy, such as chromium, and a braze 25 containing various eutectic phases which includes both mechanical brazing and partial alloying with the substrate 102.

In addition to brazing using the methods described above, the bonding of the diamond particles to the matrix material using the brazing alloy may be accomplished by mixing a powdered form of brazing alloy with a powdered form of matrix material. The organic binder is then added, and the matrix support material and brazing alloy are formed into a sheet, or layer as described above. Diamond particles are then distributed by being positioned or located in a predetermined pattern using a template as described. The sheet may then be stamped, or pressed into desired tool shapes, which are heated to a temperature sufficient to bond the diamond particles to the matrix support material using the brazing alloy, as well as to sinter together the metal particles of the matrix. Such a process generally may be accomplished using low temperatures which do not incur many of the afore-warned risks to the tool.

The most widely used matrix powder for making diamond tools (e.g., saw segments) is cobalt powder. The standard sizes of cobalt powder for making conventional diamond tools are less than 2 micrometers. In the last decade, the diamond tool manufacturers have demanded finer and finer matrix powders. The commercial suppliers (e.g., Eurotungsten Co.) are therefore, moving toward making ultrafine (one micrometer), and even ultra-ultrafine (submicron) powders. With such a trend, the sintering temperature is continuously decreasing. A lower sintering temperature not only reduces the degradation of diamond; it also reduces the cost of manufacturing. For example, the powder consumption is lower. Moreover, the oxidation loss of graphite mold is also minimized.

However, one embodiment of the present invention uses a diamond braze to fill up the pores of the matrix powder. Hence, coarse-sized powders, i.e. greater than 400 U.S. mesh or 34 microns, are preferred. Moreover, while conventional methods require the density be as high as possible so sintering can proceed rapidly, it is preferred in the present invention to use a precursor with a lower packing density to allow the easy flow of the diamond braze. In fact, sometimes, the porosity of the precursor body may be intentionally increased by using irregularly shaped matrix particles. This preference, again, is contrary to the conventional wisdom that requires the particles be as spherical as possible so the packing density can be increased.

The use of a coarse matrix powder has other benefits. For example, a coarse powder can mix better with different compositions. Hence, the diamond grit may distribute more uniformly in the matrix. Moreover, a coarse powder has a smaller surface area, and hence, a lower frictional force for infiltration. Therefore, it can flow easier in the mold. Of course, a coarse matrix powder is also much less expensive, so the production cost may be reduced.

It is important to note that this invention utilizes the matrix merely as the network for holding the diamond grit in place. Hence, the matrix may not have to be made of powder. For example, the matrix body may be made of a piece of steel with openings that contain diamond grits of PCD bodies. Further, the superabrasive containing segments may be easily formed to accommodate a variety of substrate shapes prior to brazing.

In another alternative embodiment of the present invention, a three-dimensional tool is formed having a predetermined pattern of diamond grits therein. By assembling substantially two-dimensional segments to form a three-dimensional body, the distribution of diamond grit in a tool can be positively controlled. Thus, diamond concentration in different parts of the same tool may be adjusted (see FIGS. 6A through 9). Such a control of diamond distribution is highly desirable to improve the wear characteristics of the tool. For example, the sides of a diamond saw blade are often worn faster then the center, so it is advantageous to add more diamond grit on the sides (see FIG. 6B).

Figure 6A:
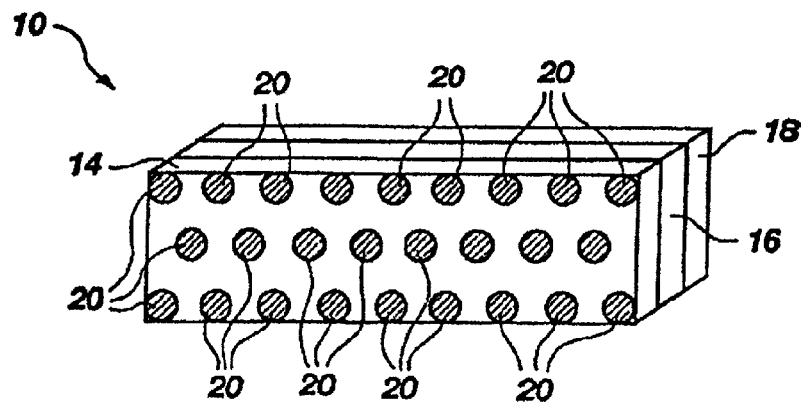
FIG. 6A shows a segment from a super abrasive tool formed by a plurality of linear, longitudinal layers disposed adjacent one another to form a three-dimensional super abrasive member.

Referring to FIG. 6A, there is shown a perspective view of a tool segment, generally indicated at 10, formed by a plurality of layers, 14, 16 and 18. Each of the layers 14, 16 and 18 is formed by matrix support material impregnated with diamond particles, indicated by the dark circles 20, and has been infiltrated with a braze selected to chemically bond to the diamond particles and the matrix support material, such bonding firmly holds the particles in the matrix support material. Preferably, the diamond particles 20 constitute less than 50 percent of the matrix support material-diamond mixture, and more preferably less than 40 percent. Keeping the amount of diamond particles to the minimum helps to minimize cost while optimizing the useful life of the product. Although FIGS. 6A through 9 show discrete layers of matrix support material, the final sintered tool segment is essentially a continuous metal matrix having superabrasive particles distributed in a particular three-dimensional pattern. Thus, the layers meld to form an essentially seamless unitary matrix having superabrasive particles therein. This continuous melded matrix improves the strength and durability of the final multi-layered tool.

As discussed in U.S. Pat. No. 6,159,286, which is incorporated herein, forming the segment 10 in a plurality of thin layers provides remarkably improved control over the distribution of the diamond particles 20. By controlling the distribution of the diamond particles 20 within each layer and then combining layers, a three-dimensional segment can be formed in which distribution of the diamond particles is controlled in each dimension. This, in turn, enables the formation of segments, which are particularly adapted to the likely use of the segment, be it for polishing, cutting, grinding, etc. By tailoring the distribution and concentration of the super abrasive particles within the segment 10, more precise control is given over performance of the tool under actual working conditions.

For example, when using a diamond saw blade to cut rocks (e.g., granite), the two sides of the diamond saw segments are cutting more materials than the center. As a result of uneven wear, the cross section of the saw segment becomes convex in shape with the center bulging above both sides. This configuration typically slows the cutting rate of the saw blade. Moreover, the protruding profile may also cause the saw blade to deflect sideways in the cut slot. In order to maintain a straight cutting path, it is sometimes desirable to make a "sandwich diamond segment" to reinforce both sides of the segment with layers impregnated with more diamond or superabrasive grits. Such a "sandwich segment" is difficult to manufacture by mixing diamond grit with metal powder by conventional means, but it can be easily accomplished by methods of the present invention: first planting diamond grits with desirable patterns and concentrations in a metal matrix layer and then assembling these metal matrix layers with diamond grits impregnated in the predetermined patterns and concentrations together to form a sandwiched segment.

The present invention further improves the above technique by infiltrating the matrix support material with a braze which is selected to chemically bond to the diamond particles and to the matrix support material. Thus, while the placement of the diamond particles shown in FIG. 6A is a marked improvement over the prior art, an additional increase in the useful life of segment 10 is obtained by utilizing a braze to form a chemical bond, rather than merely relying on mechanical retention of the diamond particles.

Figure 6B:
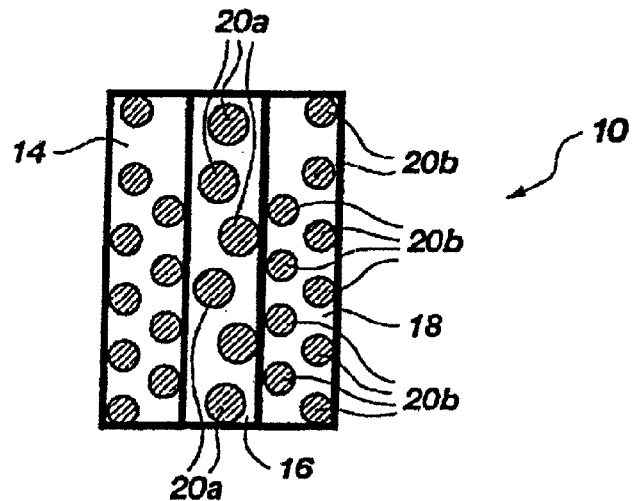
FIG. 6B shows a cross-sectional view of one typical configuration of the tool segment shown in FIG. 6A, wherein a layer formed by a matrix support material and a relatively large superabrasive is sandwiched between two layers of matrix support materials, which have smaller grit, and higher concentration of the abrasive.

Likewise, the selective placement of differing sizes of diamond particles can used to form a cutting segment formed to resist premature wear to the sides of the segment, thereby extending the cutting segment's useful life. Referring specifically to FIG. 6B, there is shown a cross-sectional view of the cutting segment 10 of FIG. 6A. Unlike the cutting segments of the prior art, the cutting segment 10 is formed of three layers, 14, 16 and 18 respectively. The middle layer 16 has a plurality of super abrasive particles 20a, which are of a first size (e.g. 40/50 mesh) and a first concentration. The outer layers 14 and 18, in contrast, have a plurality of super abrasive particles 20b, which are of a second size (e.g. 50/60 mesh) smaller than the first size, and in a second concentration greater than that present in the middle layer 16. The smaller, more densely distributed super abrasive particles 20b provide the outer layers 14 and 18 with a greater resistance to wear as they cut through concrete, rock, asphalt, etc. Because the outer layers 14 and 18 are more resistant to wear, the cutting segment 10 resists formation of a convex outer surface, as has traditionally occurred with cutting elements. By maintaining a more planar cutting surface, the cutting segment is able to maintain a straight cutting path so it can cut more efficiently with a longer useful life. Moreover, by using a smaller grit on the flank of the saw, the finish of the cut surface is smoother and chipping of the workpiece can be avoided.

Furthermore, an additional increase in useful life is obtained by infiltrating the matrix support material with a braze formed from chromium, manganese, silicon, titanium, and/or aluminum, or an alloy or mixture thereof. While a wide variety of quantities of these materials may be used, it has been found that it is preferable if the chromium, manganese, silicon, titanium, or aluminum or alloy or mixture in the diamond braze constitutes at least 3 percent of the braze by weight (and more preferably 5 percent). The braze fills the pores in the matrix support material, which is typically powder selected from the group including iron, cobalt, nickel or alloys or mixtures thereof.

Figure 7A:
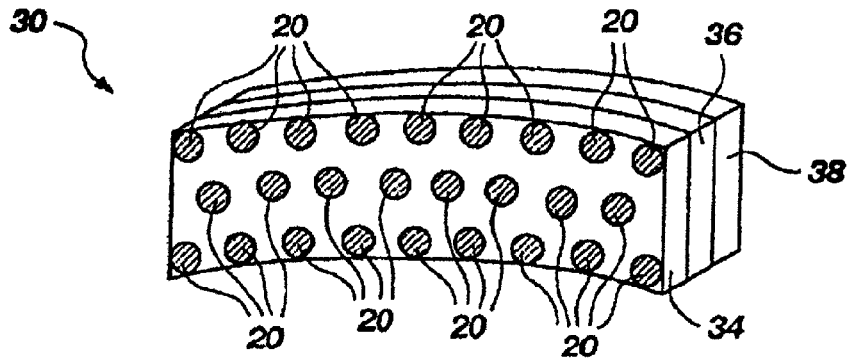
FIG. 7A shows a segment from a superabrasive tool formed by a plurality of arcuate, longitudinal layers, which are attached to one another to form a three-dimensional super abrasive member.

Another advantage to the use of multiple layers of matrix with diamond or some other super abrasive particle disposed therein is that the layers are easily formed into other desirable shapes for the cutting, drilling, grinding, etc., segment. For example, FIG. 7A shows a perspective view of a segment, generally indicate at 30, of a super abrasive tool formed by a plurality of arcuate, longitudinal layers of matrix support material which are attached to one another to form a three-dimensional super abrasive member which has been infiltrated with the braze to thereby hold the diamond within the matrix material of the member. The segment 30 is formed from first, second and third layers, 34, 36 and 38, which are each arcuate. When the three are joined together, an arcuate segment 30 is created. Such a segment, of course, may be used on cutting tools, which are non linear, and on other types of tools for which a nonlinear superabrasive segment is desired. Because the layers 34, 36 and 38 are initially formed independent of one another, they are much easier to conform to a desired shape, and are able to do so while the brazed diamond particles 20 disposed therein are held in their predetermined positions.

Each of the layers is impregnated with a plurality of superabrasive particles 20, typically diamond or cubic boron nitride. Because each layer is a relatively thin layer of metal matrix, (i.e., the metal matrix will usually be no more than two times the thickness of the diameter of the particles), superior control over placement of the superabrasive particles in the metal matrix layer can be easily achieved. As discussed above, the random placement of superabrasives in abrasive tools in the current art often lead to ineffective use of superabrasive particles. By controlling distribution of superabrasives the present invention enables either even distribution which prevents under or over spacing, or controlled distribution so that different portions of the segment have different sizes and concentrations which are matched to prevent traditional wear patterns.

Figure 7B:
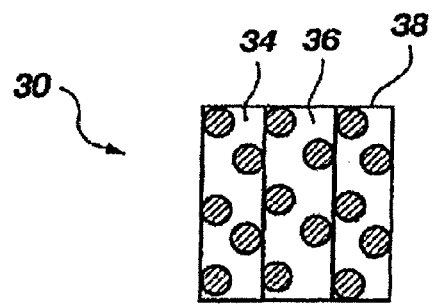
FIG. 7B shows a cross-sectional view of a plurality of layers matrix support material as may be used with the segment shown in FIG. 7A.

Referring now to FIG. 7B, there is shown a cross-sectional view of a plurality of the layers 34, 36 and 38 of the segment 30. Of course, the configuration of the diamond particles may be used with the segment shown in FIG. 6A or that shown in FIG. 7A. Unlike the embodiment of FIG. 6B, the layers are each provided with the same size and concentration of the diamond particles 20. However, because the spacing is substantially uniform, there is no under spacing or over spacing between the superabrasive particles, and the segment 30 wears more evenly than the segments of the prior art with randomly spaced particles. The more even wear prevents premature failure of the segment 30, and thus extends the life of the tool while keeping the amount of superabrasive used to a minimum. Furthermore, the braze which bonds to the diamond particles and the matrix further strengthens each layer and prevents loss of the diamond particles.

Figure 8:
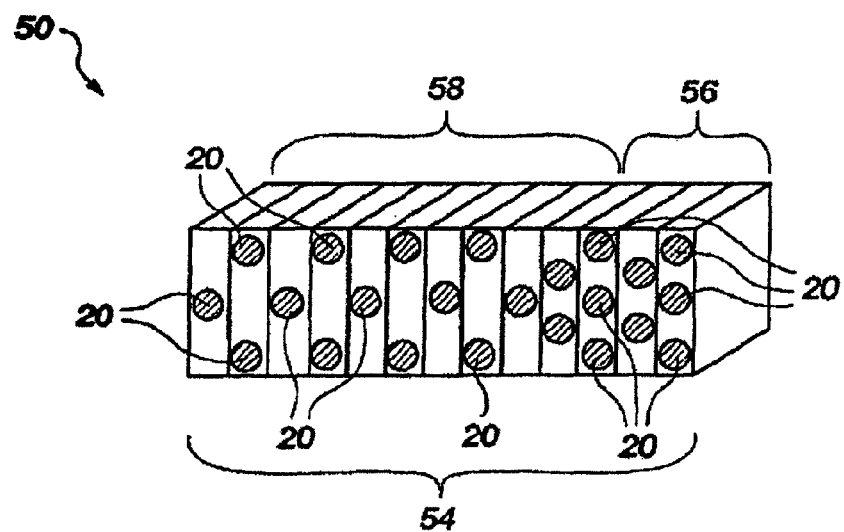
FIG. 8 shows another possible layout of a segment of a cutting tool with transverse layers configured with a denser concentration of abrasive material disposed at a forward, cutting end of the three-dimensional super abrasive member.

FIG. 8 shows another possible embodiment of a segment 50 made in accordance with the teachings of the present invention. The layered structure in a diamond segment may also be assembled transversely or horizontally, and the braze may be applied to every layer, or to select layers as shown in FIG. 8. Thus, the segment 50 in FIG. 8 is formed from a plurality of transverse layers, generally indicated at 54. A first plurality of the layers (i.e. the first four layers), indicated at 56, are provided with a first concentration of diamond particles 20 which are brazed to bond to the matrix support material. A second plurality of layers (i.e. the remaining 9 layers), indicated at 58, are provided with a second concentration, less than the first concentration and are also brazed to bond to the matrix support material.

Many cutting tools are configured such that the cutting segment 50 is provided with a lead edge which performs a majority of the cutting and which receives most of the impact force when contacting the surface to be cut. For example, a circular saw blade will usually have a plurality of teeth or segments, each tooth having a leading edge, which takes the force of the cutting. Because the leading edge performs a significant portion of the cutting, it is much more susceptible to wear than are rotationally rearward portions of the tooth. When formed in accordance with the prior art, the teeth, however, often had relatively consistent abrasive disposed thereon. Over time the leading edge wears significantly, but the other portions coated with diamond particles are subjected to minimal wear. Eventually, the abrasive is worn off the leading edge, while significant amounts remain on the other portions of each tooth. Thus, a considerable amount of super abrasive is wasted when the blade is discarded. The embodiment of FIG. 8 is specifically configured to overcome such concerns. The layers 56 and 58 are configured to provide substantially even wear across the cutting segment 50 by placing a larger percentage of the diamond particles 20 near the leading edge 56, than on rotationally distal portions 58. Thus, by the time the leading edge has reached the end of its useful life, the remaining portions of the cutting segment 50 have also been worn out. Such controlled distribution of the superabrasive particles 20 decreases the use of the expensive material and lowers the cost for making the cutting segment 50 without hurting performance. Additionally, by providing more ever wear, the cutting segment 50 will often be able to maintain most of its cutting speed until shortly before the end of its useful life. Additionally, brazing the diamond particles 20 in layers 56 and 58 further extends tool life.

Figure 9:
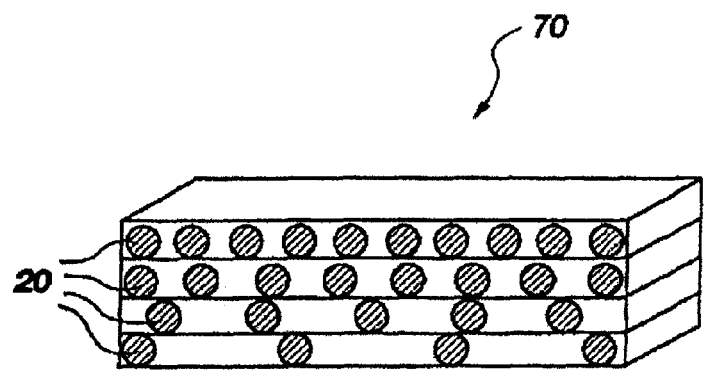
FIG. 9 shows yet another layout of a segment wherein a three-dimensional super abrasive member is formed with progressively denser abrasive distribution toward the upper surface of a tool with horizontal layers.

FIG. 9 shows yet another layout of a segment wherein a three-dimensional super abrasive member is formed with progressively denser abrasive distribution toward the upper surface of a tool with horizontal layers. As with the embodiment of FIG. 8, the controlled distribution of the diamond particles 20 forms an improved abrasive segment 70, while at the same time decreasing the cost of abrasive tools by decreasing the unnecessary consumption of diamond particles. Additionally, brazing may be used on some of the layers, while being omitted from other layers, to thereby customize the abrasive segment 70.

With routine experimentation and the teachings of the method of the present invention, those skilled in the art will be able to customize cutting, drilling, grinding, polishing and other types of abrasive segments which are specifically formed to maximize their abrasive ability (i.e. cutting, drilling, grinding, etc.) over an extended useful life, while simultaneously decreasing the amount of super abrasive which is used to form the tool in accordance with the principles of the method of the present invention.

Referring now to FIGS. 10A through 10D, there is shown one method for forming layers in accordance with the principles of the present invention. Many of the same principles may be applied with respect to the formation of layered segments as to the formation of segments described in connection with FIGS. 1 through 5 above. The first step of the method is to form a sheet 100 of matrix support material 104 which will be bonded to the super abrasive particles 20. The sheet 100 of matrix support material 104 can be formed from conventional powders such as cobalt, nickel, iron, copper, bronze, or any other suitable bonding agents. Additionally, for reasons, which are discussed in detail below, it is highly advantageous to use coarse powders, such as those above 34 microns (400 mesh) in diameter. While the use of coarse powders is inconsistent with the current teachings that it is desirable to use the finest powder available, considerable benefits may be achieved by combining course powder and braze to secure diamond particles in place.

Figure 10A:
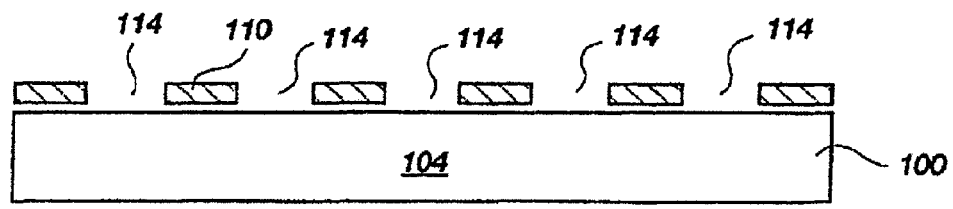
FIGS. 10A through 10D show one possible method for forming layers with controlled superabrasive distribution within the layer.

Once the sheet 100 of matrix support material 104 is formed, a template 110 is laid on the top of the sheet as shown in FIG. 10A. The template 110 contains apertures 114 that are larger than one abrasive particle 20, but smaller than two abrasive particles, thereby allowing a single particle of the abrasive to be disposed at each specific location. The thickness of the template is preferably between ⅓ to ⅔ of the height of the average abrasive particle 20. However, other thicknesses may be used if appropriate accommodations are made for seating the abrasive particles in the desired locations.

After the template 110 is properly positioned, a layer of abrasive particles 20 is then spread over the template so that each aperture 114 receives an abrasive particle. Those particles not falling into the apertures 114 in the template 110 are removed by tilting the substrate, sweeping the template with a broom, or some other similar method.

Figure 10B:
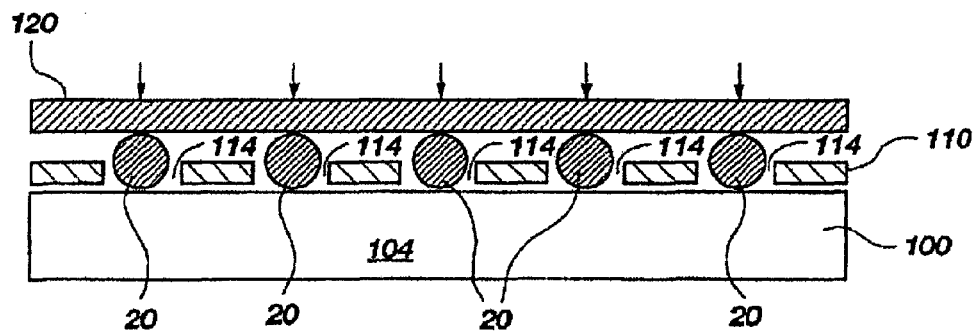

As shown in FIG. 10B, a generally flat surface 120, such as a steel plate, is then laid over the particles 20, which rest in the apertures 114 in the template 110. The flat surface 120 presses the abrasive particles 20 at least partially into the pliable sheet 100 of matrix support material 104 to seat the particles.

Figure 10C:
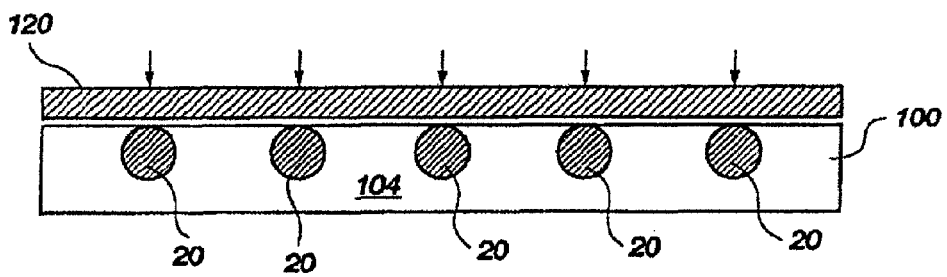

After removing the template 110, the flat surface 120 is used again to press the abrasive particles 120 firmly into the sheet 100 of matrix support material 104 as shown in FIG. 10C. While the flat surface 120 is preferable, those skilled in the art will appreciate that there may be occasions when it is desirable to have some of the abrasive particles 20 extend outwardly from the sheet 100 of matrix support material more that other abrasive particles. In such situations, a contoured or otherwise shaped surface could be used to seat some of the abrasive particles 20 deeper into the sheet 100 of matrix support material 104, than other particles.

The sheets 100 may be first assembled to form the precursor of the tool segment and then hardened and finished using the infiltration and sintering techniques set forth above, or they can be hardened and finished individually, and subsequently assembled and combined to form the tool segment or the entire tool body where appropriate. Typically, the assembly of the sheets 100 is accomplished by a known method such as cold compaction with a press. The "green" body so formed can then be consolidated to form a final tool product by sintering or infiltration as described above.

Figure 10D:
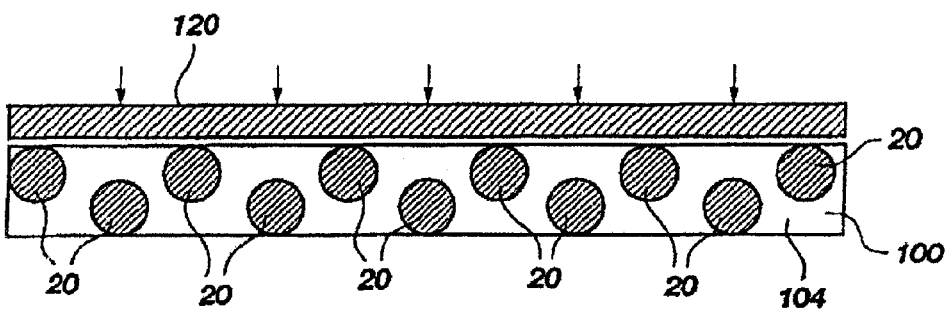

If desired, the process shown in FIGS. 10A through 10C can be repeated on the other side of the sheet 100 of matrix support material 104 (as shown in FIG. 10D), to form an impregnated layer having diamond particles 20 distributed throughout the layer in some predetermined, desired pattern. The process is typically repeated several times to obtain multiple thin layers or sheets 100, which are impregnated with the diamond particles 20. Of course, each sheet 100 need not have the same distribution pattern for the diamond particles 20, nor need the concentration of the abrasive particles be the same in each sheet.

While the method described in FIGS. 10A through 10D is preferred for many applications, there are instances where it is desirable to have the abrasive particles 20 extend outwardly from the sheet 100 of matrix support material. For example, some tools may only have one layer of abrasive. This can be accomplished simply by leaving the template 110 in place when performing the steps shown in FIGS. 10A and 10B, and not further pressing the particles 20 into the matrix support material once the template has been removed.

Figure 11A:
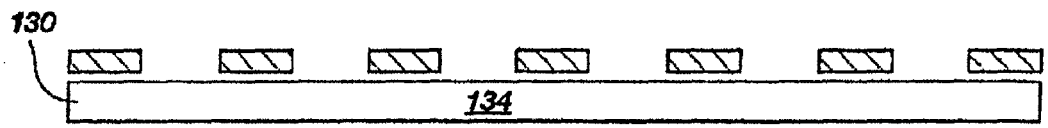
FIGS. 11A through 11C show an alternate method for forming one or more layers with controlled superabrasive distribution.
Figure 11B:
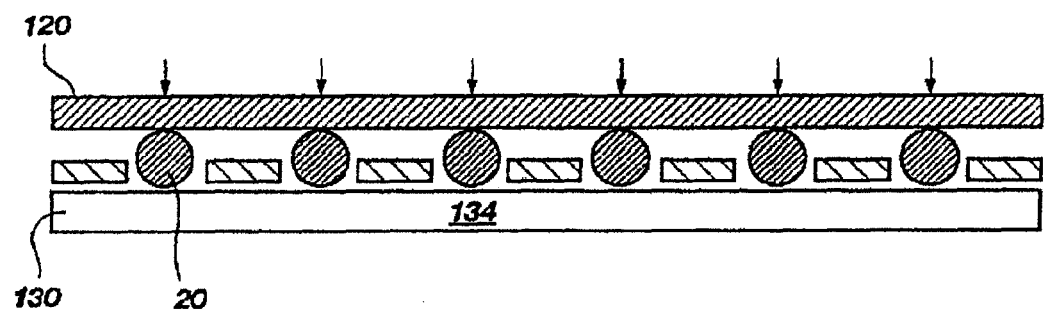
Figure 11C:
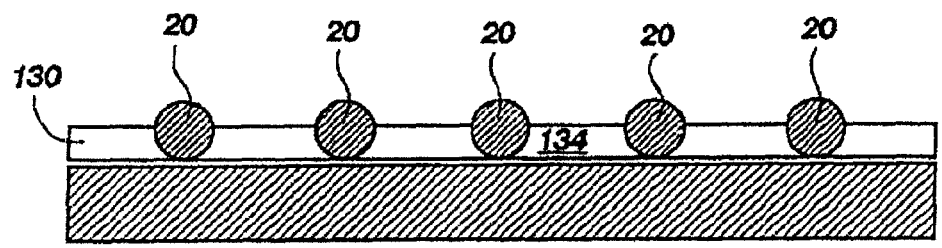

In the alternative, FIGS. 11A through 11C show a side view of an alternate to the method discussed in FIGS. 10A through 10D. The sheet 130 of matrix support material 134 in FIGS. 11A through 11C is formed to be of a lesser thickness than the cross-sectional thickness or diameter or the superabrasive particles 20. When the particles are pressed into the sheet 130, the thickness of the sheet forces the superabrasive particles 20 to protrude from the matrix support material 134. The sheet 130 is then infiltrated with diamond braze in the manner discussed above.

While the spacing of apertures of the template shown in FIG. 11A through 11C is generally uniform, according to one aspect of the invention, such spacing need not be uniform, and can be according to any desired pattern. As such, variations in spacing can be provided to facilitate different concentrations on various portions to facilitate different concentrations on various portions of the sheet 130 of matrix material 134. Likewise, by controlling the size of the apertures and the order in which the diamond particles are placed in the apertures, a single layer could be provided with particles of different sizes.

Figure 12A:
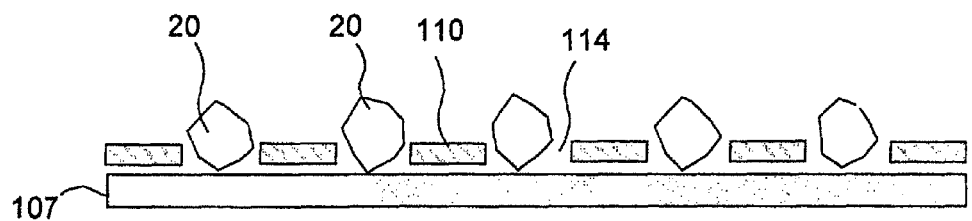
FIGS. 12A through 12C show another alternative method for forming one or more layers with controlled superabrasive distribution using a sheet of amorphous brazing alloy.
Figure 12B:
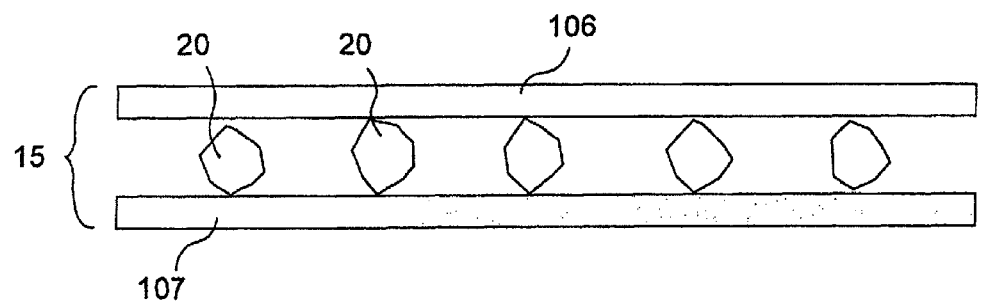
Figure 12C:
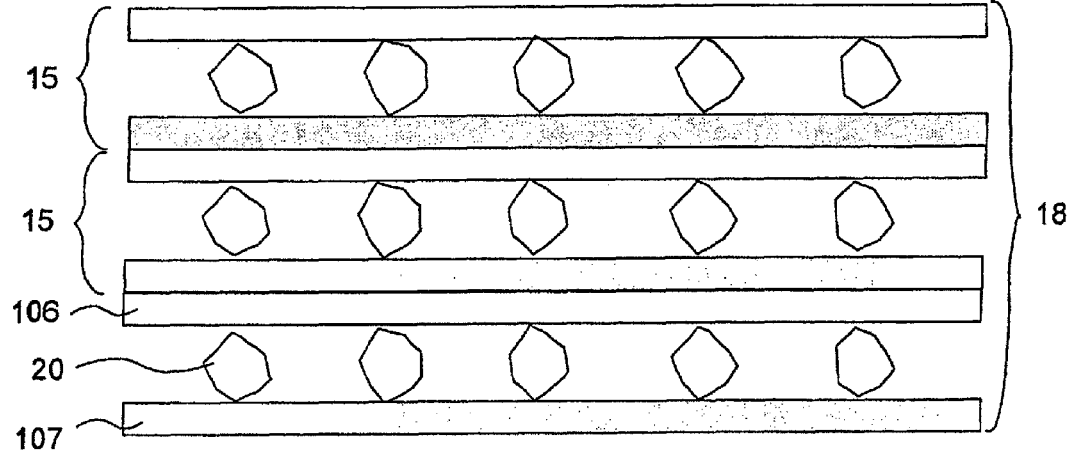

In yet another alternative, FIGS. 12A through 12C show a side view of a method of forming superabrasive containing layers using sheets of amorphous braze alloy. Again, in a similar manner as previously discussed, FIG. 12A shows a template 110 having a plurality of apertures 114 arranged in a predetermined pattern, which is placed on a thin substrate or sheet of matrix support material 107. The superabrasive particles 20 are then placed in the apertures and fixed in position with an adhesive or the like. As before, the flat surface may be contoured to accommodate various tool configurations. The template 114 may be removed. A sheet of amorphous brazing alloy 106 is then placed over the superabrasive particles 20 as shown in FIG. 12B to form a single layer segment 15. In an alternative embodiment, the sheet of amorphous brazing alloy 106 may be placed on the substrate or matrix support material layer prior to placement of the superabrasive particles thereon.

Several single layer segments 15 may then be formed and combined into a single multi-layered precursor 18, or green body, as shown in FIG. 12C. The single layer segments 15 may be secured using an adhesive as in the discussion of FIGS. 6A through 6D or brazed using a traditional (i.e. does not necessarily contain a carbide former) brazing alloy. This precursor may be formed of layers of uniform distribution of superabrasive grits similar to FIG. 7B or of varying configurations, concentrations and/or particle size as in FIG. 6B. The method of the present invention includes configurations in which some of the layers are void of superabrasive particles altogether. Further, the matrix support material 107 may be a layer of metal or an unsintered metal powder as described above. The resulting tool segment would have different properties depending on which type of support material is chosen.

Figure 13:
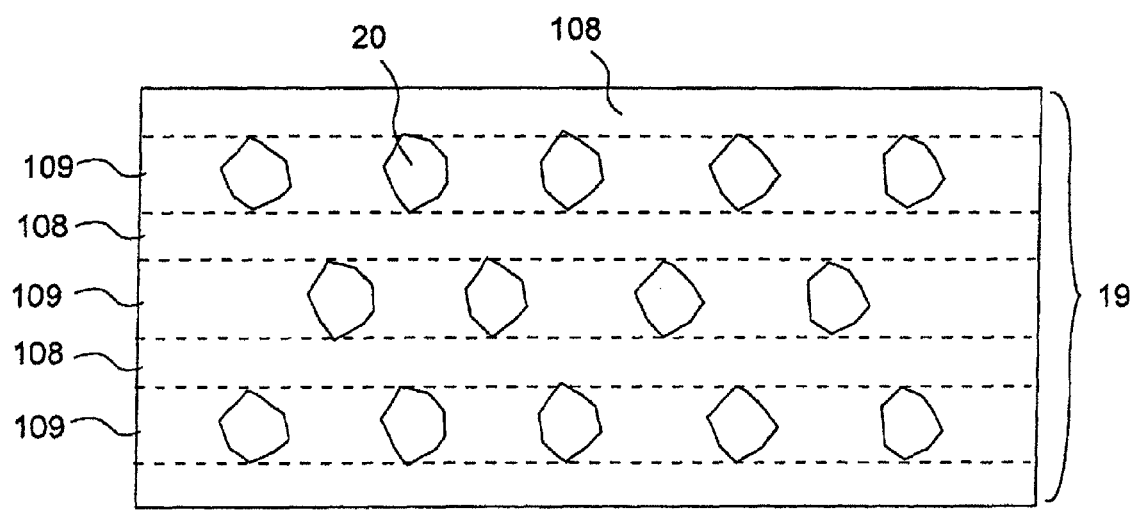
FIG. 13 shows a side view of a consolidated tool segment formed from multiple layers having a three-dimensional pattern of superabrasives.

The precursor 18 is then placed in a vacuum furnace and heated to a sufficient temperature to cause the sheet of amorphous braze alloy 106 to melt and bond to the superabrasive particles 20 and to the layer of metal 107 to form a melded multi-layered tool having the desired pattern of superabrasive particles distributed throughout as shown in FIG. 13. FIG. 13 shows a consolidated superabrasive tool segment 19 wherein the superabrasive particles 20 are arranged in a predetermined three-dimensional pattern. The areas identified by 108 and 109 illustrate generally the layers of metal and braze alloy, respectively. The dotted lines are for illustrative purposes only and those skilled in the art will recognize that the actual final tool segment may differ. For example, if the sheet of braze alloy is thinner than the diameter of the particles and the metal layer is solid during the consolidation process the final tool may have empty voids between particles. Further, if the layer of metal is formed of unsintered powder the consolidation process will cause the final tool to be much more homogenous due to infiltration of the brazing alloy throughout the metal powder. The thickness of the layer of metal 107 and the sheet of braze alloy 106 may be of varying thickness. The thickness of the layer of metal 107 and/or the sheet of brazing alloy may be less than the diameter of the superabrasive particles 20, as shown in FIG. 12A or either may be thicker than the diameter of the superabrasive particles used.

During the heating process the precursor assembly is heated to just over the liquidus temperature to allow the braze alloy to flow somewhat. Maintaining the braze alloy, and the matrix or metal layer, near the liquidus temperature helps to prevent substantial movement of the particles from their intended positions. Typically, a temperature of about 5° C. above the liquidus temperature over a relatively short period of time, about 10 to about 20 minutes, is sufficient to obtain the desired results.

EXAMPLES

Example 1

40/50 mesh diamond grit (SDA-85+ made by De Beers Company) were mixed with iron powders and an organic binder to form a mixture with diamond concentration of 20 (5% of total value). The mixture was cold pressed in a steel mold to form the shape of a saw segment. The precursor was placed in a graphite mold and overlaid with a powder of Nicrobraz LM. The mold was heated under vacuum to about 1,050° C. for 20 minutes. The infiltrated braze had bonded diamond and matrix powder together for form a segment. Twenty-four of such segments were manufactured and they were trimmed to desirable tolerances. These segments were brazed onto a 14-inch round steel circular saw blade. The blade was used to cut granite at a faster cutting rate than was possible with conventional diamond saw blades. Additionally, the brazed saw blades had a longer useful life than a conventional diamond saw blade.

Example 2

40/50 mesh diamond grit (SDA-85$^+$ made by De Beers Company) were mixed with metal powder to form a mixture with a diamond concentration of 20 (5% of total volume). Five different proportions of cobalt (about 1.5 micrometer in size) and bronze (about 20 micrometers in size) were used for the matrix powder. An acrylic binder was added (8% by weight) to the mixture and the charge was blended to form a cake. The cake was then rolled between two stainless steel rollers to form sheets with a thickness of 1 mm. These sheets were cut in the shape of saw segments with a length of 40 mm and width of 15 mm Three each of such segments were assembled and placed into a typical graphite mold for making conventional diamond saw segments. The assembled segments were pressed and heated by passing electric current through the graphite mold. After sintering for three minutes, the segments were consolidated to a height of 9 mm with less then 1% porosity. Twenty-four segments for each composition were fabricated. They were brazed onto a circular saw of 14 inches in diameter. These five blades were used for cutting granites and found to perform equal or better than those with higher diamond concentrations (e.g. 23) made by conventional methods. Microscopic examination of the worn segment indicated that although diamond particles were not planted into the layered matrix, they were distributed more evenly than segments prepared by the traditional method. The segregation of particles in a layered matrix was considerably less than that in the thick body of conventional segments.

Example 3

The same procedures were followed as Example 2, but with 8 thinner layers (0.4 mm) for each segment. The diamond concentration was reduced to 15 and particles were positively planted according to the illustration as shown in FIGS. 10A through 10D. The diamond distribution was much improved. As a result, the performance of these blades were equal or better than those made by conventional methods with diamond concentration of 20.

Example 4

Iron powders of about 100 mesh were mixed with an S-binder made by Wall Colmonoy Company to form a cake. The cake was then rolled to form sheets of 0.4 mm in thickness. 40/50 mesh SDA-100+ diamond grit was positively planted into these sheets to attain a concentration of 15. These diamond containing sheets were cut in the shape of saw segments with a length of 40 mm and width of 9 mm. Eight of such segments were assembled as a group and placed in a graphite mold. Twenty-four groups were placed horizontally, and another twenty-four groups were placed vertically in the graphite mold. Nicrobraz LM powder (−140 mesh) (made by Wall Colmonoy Company) was added on the top of these segments. These samples were heated in a vacuum furnace ($10^{-5}$ torr) to 1050° C. for 20 minutes for horizontally placed segments, and 30 minutes for vertically placed segments. The melted LM alloy (Ni—Cr—B—Si with a liquidus point at 1000° C.) infiltrated into these segments and filled the porosity. The excess LM braze on these segments were ground by electrode discharge (EDG). Each of the 24 segments so fabricated were brazed onto a 14 inch (diameter) circular saw blade. These blades were used to cut granite and showed marked improvement over conventional saw blades.

Example 5

Nicrobraz LM powder was mixed with an acrylic binder and rolled to form layers of about 0.25 mm. 40/50 mesh MBS-960 diamond grit manufactured by General Electric Company was positively planted into these metal layers according to the method as illustrated in FIG. 10A through 10D. These diamond planted metal layers were cut in proper size and wrapped around 2,000 beads (pearls) of wire saw. These beads (10 mm in diameter by 10 mm long) were divided into two groups; one contains 280 crystals (about 0.2 carat). These beads were heated in a vacuum furnace to a temperature of 1,000° C. for 8 minutes. These beads were mounted on several wire saws and were used to cut marble, serpentine and granite. The performance of these beads was found to be superior to conventional beads. The latter beads were typically made by either hot pressing or electroplating. These conventional beads may contain a much higher amount of diamond (up to 1 carat) per bead.

Example 6

The same method as described by Example 5, but applied to other products, e.g., circular saws, thin-wall core bits, and curvature grounder. Each of these products shows superior performance over conventional electro-plated diamond tools having similar superabrasive concentrations.

Example 7

Mixture of metal powders that contain 87 wt % of −140 mesh Nicrobraz LM (made by Wall Colmonoy, U.S.), 8 wt % of iron of −125 mesh, and 5 wt % of copper of −60 mesh were mixed with 3 wt % of an acrylic binder to form a dough. The dough is rolled between two rollers to form sheets of 0.6 mm thick. Each sheet is cut to shape and covered with a template. 30/40 mesh (0.420 to 0.595 mm) diamond grits of SDA-100+ grade (made by De Beers, South Africa) were positively planted into the metal layers in a predetermined pattern with a diamond-to-diamond distance of about 2 mm. Three layers were stacked together and wrapped around a steel sleeve to form a diamond bead of 10 mm in diameter and 10 mm in length. These beads were heated in a vacuum furnace to consolidate the metal and also braze the diamond in place and onto the steel sleeve. 1,000 of such diamond beads were fitted over 5 mm steel cable that contained 7×19 wires, and they are spaced by plastic coating formed by injection molding. The wire was 25 meters long and it was joined end-to-end to form a loop. This wire saw was used to cut granite blocks (3.5 meter long by 1.8 meter high) of all grades. The life achieved was 0.5 square meter cut surface per diamond bead consumed (0.5 carat). This area cut is twice of that cut by conventional diamond beads made by a powder metallurgical method.

Example 8

This is the same as example 7, except many diamond impregnated layers were assembled to form a block of 20 mm long by 5 mm thick by 7 mm high. These blocks were consolidated in a vacuum furnace to form diamond segments. Each segment contained about 8 volume percent diamond. 30 of such segments were brazed onto a 4 meter long steel frame and the fame was mounted on a reciprocating sawing machine. The saw was used to cut marble blocks with a life more than twice longer than conventional diamond segments produced by powder metallurgical methods.

Example 9

This is the same as example 8, except the diamond planted layers were assembled to form segments of about 24 mm long by 3.5 mm thick for a core bits of 150 mm in diameter. The diamond content in these segments was about 4 V %. 10 of such core bits were used to drill concrete. The drilling speed and the life of these core bits were much higher than conventional diamond segments made by powder metallurgical methods.

Example 10

This is the same as example 9, except the shape of segments is for circular saws. These segments were brazed to make circular saws of 230 mm (with 18 segments of 40 mm by 8.5 mm by 2.4 mm), 300 mm (with 21 segments of 50 mm by 8.5 mm by 2.8 mm), and 350 mm (with 24 segments of 50 mm by 8.5 mm by 3.2 mm) in diameter. These saws were used to cut granite, asphalt, and concrete with superior performance.

Example 11

This is the same as Example 8, except the segments are used as dressers for conditioning grinding wheels.

Example 12

A single layer of 14/16 mesh (1.4 mm to 1.2 mm in size) diamond grits (natural diamond EMB-S made by De Beers)

positively planted sheet is covered over a pellet of 20 mm diameter by 8 mm thickness. Many of these pallets were brazed in a vacuum furnace. More than 3000 of such pallets were mounted on floor grinding machines to grind stone and wood floors. The results indicate that the grinding speed could be three times faster than conventional diamond grinders.

Example 13

A single layer that contained positively planted diamond grits of 40/50 mesh (0.420-0.297 mm size) ISD 1700 grade (made by Iljin Diamond of Korea) was laid over the curved surface of a profile wheel and brazed to form a rigid tool in a vacuum furnace. More than 100 of such profile wheels of various diameters were used to form the edges of granite and marble slabs. These profile wheels were capable to cut more than 3 times faster than conventional diamond tools made by either electroplating or sintering method.

Example 14

This is the same as example 13, except that the diamond planted layer is wrapped around a steel sleeve to form a single layered diamond beads. More than 100,000 of such beads were manufactured. They were used to cut granite or marble with superior performance.

Example 15

This is the same as example 12, except the diamond grits were 80/100 mesh, and the diamond planted layer was used to cover the surface of a flat disk of 4 inches in diameter. 4 such disks were produced and used as conditioner to dress the CMP (chemical and mechanical polishing) pad that polished silicon wafers. The result indicated that the CMP efficiency was much improved and the conditioner outlasted conventional conditioners made by either electroplating or brazing.

Example 16

Wall Colmonoy's Nicrobraz LM powder is used as the braze. It is mixed with either iron powder (Fe), copper powder (Cu), or both in various proportions (the following refer to the weight percentage of the overall mixture): 90LM/10SiC; 90LM/10WC; 100LM; 92LM/8Fe; 90LM/10Cu; 82LM/8Fe/10Cu; 80LM/20Cu; 72LM/8Fe/20Cu; 70LM/30Cu; and 60LM/40Cu. The mixture also contains 4 weight percent of an acrylic binder that is used to glue all powder together. The mixture is cold pressed to form a sheet and heated to 400° C. for 30 minutes in air to burn out most of the organic binder. The preform is then placed in a vacuum oven maintained at a pressure of $10^{-5}$ torn Heating is applied to a temperature of 1010° C. for 12 minutes. After the LM was completely melted and it infiltrated (or metal sintered by the aid of molten LM) the solid metal powder the consolidated mass is cooled. After cooling the consolidated mass is taken out of the oven and tested for hardness and abrasion resistance. It was discovered that the HRB hardness for these compositions are 140, 130, 120, 118, 116, 110, 108, 100, 100, and 70, respectively. The abrasion resistance is decreases in the same order.

The hardness or abrasion resistance is important, as it must match the wear rate of diamonds in a tool so the grit can be exposed to the proper height for cutting a work piece efficiently. When an abrasive material, such as diamond particles, is bonded to a soft matrix it may become over exposed. As a result, the abrasive material may be shattered or dislodged during the cutting action thus reducing the tool life.

It has been determined based on these experiments that diamond bonded on a 92LM/8Fe matrix is most suitable to cut hard materials such as concrete, granite, and sandstone. A 80LM/20Cu matrix is more suitable to cut softer materials such as limestone and marble.

Diamond grits of 30/40 mesh (SDA-100+ of De Beers Company) were mixed with an 80LM/20Cu matrix. Various cutting tools containing 30 concentration diamonds (about 8 volume percent) were produced. Tools included circular saw segments, gang saw segments, and wire saw beads which were then brazed to circular saw blades, reciprocatively cutting gang saw blades, and steel cables respectively. Although somewhat random, these tools were used to saw a variety of rocks with long lives and high cutting rates.

Example 17

This is an example of sintering solid braze powder together without the melting step. LM powder was mixed with either Fe, Cu, or both in various proportions and an acrylic binder (4 weight percent) to form a dough. The dough is then rolled using steel rollers to form sheets 1 mm thick. 30/40 (18 concentration) and 40/50 (22 concentration) diamond grits of SDA-100+ were positively planted into these sheets using a template that contained holes of proper size in fixed positions. These sheets were cut to a size of 40 mm long by 8 mm wide. Five of these cut sheets were stacked together with three center layers that contained 30/40 mesh diamond. The assembly was hot pressed in a graphite mold at 400 atm and 900° C. After cooling, the segments were brazed onto circular steel blades. The blades with matrices containing 80LM/20Cu and 80LM/10Fe/10Cu performed satisfactorily.

Example 18

In this example single layer diamond forms are brazed directly onto the substrate for making a pad conditioner. LM powder is mixed with 4 weight percent of acrylic binder to form a malleable dough. The dough is rolled between two steel rolls to form a layer 0.2 mm thick. 80/90 mesh diamond grits of IMD-H as manufactured by Iljin Diamond Company was used to plant into the sheet. The planting was guided by a template that fixed the diamond to diamond distance as 0.7 mm. The diamond planted LM layer is then trimmed in size and glued using an organic binder to a flat stainless (316) plate 6.5 mm thick. The assembly is then heated in vacuum to 1010° C. for 10 minutes. The heating caused the LM to melt and bond to the substrate. The finished diamond disk is used as a pad conditioner that dressed the pad during the chemical and mechanical planarization (CMP) of silicon wafers. The result indicates that such diamond disk can double the life when compared to a conventional diamond disk that contains randomly distributed diamond grits.

Example 19

This is the same as Example 18, except the Nicrobraz LM powder is 140 mesh.

Example 20

Nicrobraz LM powder of 325 mesh is mixed with Nicrobraz S binder to form a slurry. The slurry is then sprayed onto 100 round stainless steel pallets of 20 mm in diameter and 8 mm thickness to form a thin coating. The spraying process was repeated until a thickness of 0.15 mm was achieved. After the coating is dried, a template with holes drilled to form a square grid with a distance of 0.5 mm between holes is placed on the substrate. 100/120 mesh diamonds are then placed on the substrate to form the predetermined grid pattern. The template is then removed leaving the diamond particles adhered to the surface. The binder is then removed by heating in an oven in air at 200° C. for 2 hours. The assembly is then heated in a vacuum to 1,005° C. for 10 minutes. During this process, the molten braze has wetted the diamond and capillary force has pulled down the diamond particles to touch the substrate. The results are diamond pallets with diamond firmly brazed to form a wetting slope and these diamond crystals form a predetermined pattern of grid. The resulting tool is well suited for use in CMP applications.

Example 21

This is the same as example 12, except that the slurry is a ready made product supplied by Wall Colmonoy as NICRO-SPRAY.

Example 22

This is the same as example 12, except the slurry is prepared by suspending NICROBRAZ LN powder in a methanol benzene solution containing Nanbau resin (manufactured in Taiwan).

Example 23

The braze is provided as a sheet of amorphous braze alloy manufactured by Honeywell as MBF-20 foil about 0.001" thick. Various sizes are punched out of the foil and glued to round stainless steel substrate. A template is then used to arrange 80/90 mesh diamond particles in a predetermined grid pattern. The assembly is then dewaxed and heated in a vacuum furnace to melt the alloy and bond the diamond to the substrate. The final tool is used as a pad conditioner for CMP applications. The resulting tool demonstrates that the polishing rate can be sustained much longer than conventional pad conditioners. Further, defects on the semiconductor wafers is greatly reduced.

Example 24

The braze is provided as a sheet of amorphous braze alloy manufactured by Honeywell as MBF-20 foil, having a thickness of 0.002". Annular sections 100 mm in diameter having 50 mm holes at the center are punched out of the foil. A template is then placed on the annular ring of amorphous braze and 60/80 mesh diamond particles are sprinkled over the template surface. The excess diamonds are removed and then the template is removed leaving the diamonds particles set in a predetermined pattern. An additional annular ring is glued on the top of these diamond particles. Six of such amorphous alloy-diamond amorphous alloy sandwiches are assembled with a stainless ring of the same size but with a thickness of 0.1 mm between every two of such layers. An acrylic adhesive is used to glue the assembly together. The final assembly is then heated to 200° C. for 2 hours to drive off the adhesive. The assembly is then heated in a vacuum furnace at 1,005° C. for 15 minutes. The resulting tool is a three dimensional structure that contains a diamond array not just on surface but also in volume. This three dimensional structure is then mounted to a chuck with a shaft for use as a grinding wheel. Such a grinding wheel has the unique feature of containing connected pores around diamond. These pores can serve as runways for removing cutting debris. The openness of this grinding wheel makes it free cutting so the cutting speed is twice that of conventional grinding wheels. Conventional grinding wheels using metal as matrix contains no such interconnected pores.

A distinct advantage cutting tools of the present invention have over the prior art cutting tools lies in the manner in which the tool may be used. Diamond saws are typically made in the form of a circular blade that cuts the workpiece by rotation in the same direction with each rotation. This one directional movement causes a "tail" to be formed, wherein the matrix material rotationally forward of the diamond particle is worn away, but the matrix material behind the diamond particle is protected by the diamond particle. If the saw rotation were to be reversed, the diamond particle would easily be knocked free of the matrix.

Round saws, however, can only cut the work piece to a depth of less than one-half the diameter of the saw. In order to cut thicker workpieces, a frame or gang saw is typically used. Because these saws move reciprocally, the diamond particles must be securely held on each side. As a result, tails of diamond matrix cannot be maintained to hold the diamond particles in place. It is for this reason that reciprocating diamond saws have not been used to cut hard rock such as granite. Rather they are used to cut only soft materials such as marble.

This invention allows diamond to be held chemically by a braze. Hence, matrix tails are not needed to support the diamond. As a result, tools made according to the present invention can be used on reciprocating saws to cut hard materials. This breakthrough can expand diamond applications to markets, which were previously unavailable due to limitations of the prior art.

In addition to being able to improve the performance of the tool and to reduce the cost of manufacturing, this invention also provides an easier method for making thin bladed tools. For example, the electronic industry requires using larger and larger silicon wafers (now 12 inches in diameter). Hence, thinner saw blades for slicing silicon crystals, and thinner dicing wheels for grooving silicon chips with tighter partitions have been in great demand.

Prior to the present invention, it has been extremely difficult to make very thin tools that contain evenly distributed diamond particles. The present invention provides an alternative method for making such tools. For example, it has been discovered that by mixing micron powders of diamond, a blend of metal powders (e.g., bronze and cobalt) and a suitable binder, the material can be rolled to a thickness thinner than 0.1 mm—a thickness which is thinner than most dicing wheels. By firing this thin sheet and mounting it on a tool holder, a thin dicing wheel can be made.

In the alternative to the above, it has been found in accordance with the present invention that some of the advantages of the controlled distribution, multilayered superabrasive configurations described above can be achieved without the use of a template. More specifically, the abrasive particles can also be mixed in with the matrix powder and made as an ingredient of the layered sheet. In this case, the distribution of abrasive particles is still somewhat random. Even so, their distribution is typically more uniform than that in a conventional abrasive body. The segregation of abrasive particles and matrix powders discussed in the background section is less extensive in a substantially two-dimensional sheet than in a three-dimensional body. This is particularly true for sheets made by a deforming process (e.g., by rolling). In this case, abrasive particles are further spread out in the matrix by the shearing action of the rollers.

This invention may also be applicable to other applications not related to making abrasive tools. For example, graphite or metal sheets planted with diamond particles may be used as seeds for diamond growth under high pressure and temperature. Industrial diamonds are typically produced by compressing alternative layers of graphite and metal catalyst (e.g., Fe, Co, or Ni alloy) to high pressure and heating above the melting point of the catalyst. Diamond will then nucleate randomly on the interface of these layers. The quality of the diamond crystal formed often suffers by the impingement of growing crystals that are distributed unevenly. Hence, the yield and cost of diamond synthesis can be substantially improved by making the nuclei uniformly distributed. This invention can provide layers of either graphite or metal catalyst with a pre-determined pattern of diamond seeds. If organic binders are introduced during the fabrication of these layers, they can be removed by heating in a furnace before loading into the press.

Thus, there is disclosed an improved method for making superabrasive tools with improved performance. The above description and examples are intended only to illustrate certain potential uses of this invention. It will be readily understood by those skilled in the art that the present invention is susceptible of a broad utility and applications. Many embodiments and adaptations of the present invention other than those herein described, as well as many variations, modifications and equivalent arrangements will be apparent from or reasonably suggested by the present invention and the forgoing description thereof without departing from the substance for scope of the present invention. Accordingly, while the present invention has been described herein in detail in relation to its preferred embodiment, it is to be understood that this disclosure is only illustrative and exemplary of the present invention and is made merely for purpose of providing a full and enabling disclosure of the invention. The forgoing disclosure is not intended or to be construed to limit the present invention or otherwise to exclude any such other embodiment, adaptations, variations, modifications and equivalent arrangements, the present invention being limited only by the claims appended hereto and the equivalents thereof.

It is to be understood that the above-referenced arrangements are illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the invention as set forth in the claims.

What is claimed is:

1. A method for making a CMP pad dresser, comprising:
    arranging a plurality of superabrasive particles on a 4 inch diameter flat disk in a metal matrix comprising a brazing alloy sheet at specific positions such that the plurality of superabrasive particles are held in the brazing alloy sheet according to a predetermined pattern, wherein tips of each of the plurality of the superabrasive particles protrude from the brazing alloy sheet to a uniform height having a variance that is less than or equal to 50 μm, said superabrasive particles being disposed in different sizes and/or different concentrations at different parts of the brazing alloy sheet, and wherein the plurality of superabrasive particles is positioned in the predetermined pattern at a first location and the predetermined pattern of the plurality of superabrasive particles is transferred to a second location on the brazing alloy sheet in order to be held in the brazing alloy sheet.

2. The method of claim 1, wherein arranging the plurality of superabrasive particles includes:
    placing a template having a plurality of apertures corresponding to the predetermined pattern at a first location upon a transfer plate;
    filling the apertures with superabrasive particles;
    removing the template from the transfer plate; and
    transferring the superabrasive particles to the brazing alloy sheet at the second location using the transfer plate such that the superabrasive particles are arranged in the predetermined pattern.

3. The method of claim 2, wherein the template is configured to hold only one superabrasive particle in each aperture.

4. The method of claim 2, further comprising affixing the superabrasive particles to the transfer plate with an adhesive.

5. The method of claim 1, wherein the uniform height is an equal height.

6. The method of claim 1, wherein the predetermined pattern is a uniform pattern.

7. The method of claim 1, wherein the plurality of superabrasive particles is diamond or cBN.

8. The method of claim 1, wherein the plurality of superabrasive particles is diamond.

9. A method for making a CMP pad dresser, comprising:
    forming a metal matrix comprising a brazing alloy sheet on a 4 inch diameter flat disk to hold a plurality of superabrasive particles therein;
    placing a template having a plurality of apertures corresponding to a predetermined pattern upon a transfer plate at a first location;
    filling the apertures with superabrasive particles;
    removing the template from the transfer plate; and
    transferring the superabrasive particles to a second location, said second location being on the brazing alloy sheet, using the transfer plate such that the superabrasive particles are arranged in the predetermined pattern in the brazing alloy sheet, wherein tips of each of the plurality of the superabrasive particles protrude from the brazing alloy sheet to a uniform height having a variance that is less than or equal to 50 μm, and wherein the plurality of superabrasive particles are disposed in different sizes and/or different concentrations at different parts of the brazing alloy sheet.

10. The method of claim 9, wherein the uniform height is an equal height.

11. The method of claim 9, wherein the template is configured to hold only one superabrasive particle in each aperture.

12. The method of claim 9, wherein the predetermined pattern is a uniform pattern.

13. The method of claim 9, wherein the plurality of superabrasive particles is diamond or cBN.

14. The method of claim 9, wherein the plurality of superabrasive particles is diamond.

15. The method of claim 9, further comprising affixing the superabrasive particles to the transfer plate with an adhesive.

16. The method of claim 15, further comprising applying a secondary adhesive at the second location, wherein the secondary adhesive bonds to the superabrasive particles more strongly than the adhesive.

17. The method of claim 9, wherein the transfer plate is transparent.

18. A CMP pad dresser made according to the method of claim 9.

* * * * *